United States Patent
Peterson et al.

(10) Patent No.: US 9,094,470 B2
(45) Date of Patent: *Jul. 28, 2015

(54) WEB SERVICES-BASED COMMUNICATIONS FOR USE WITH PROCESS CONTROL SYSTEMS

(75) Inventors: Neil J. Peterson, Austin, TX (US); David L. Deitz, Austin, TX (US); Grant Wilson, Austin, TX (US); Ling Zhou, Cedar Park, TX (US); Ebtesam S. Tanyous, Cedar Park, TX (US); Christopher J. Worek, Austin, TX (US); Mark J. Nixon, Round Rock, TX (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 42 days.

This patent is subject to a terminal disclaimer.

(21) Appl. No.: 13/290,656

(22) Filed: Nov. 7, 2011

(65) Prior Publication Data
US 2012/0054273 A1    Mar. 1, 2012

Related U.S. Application Data

(63) Continuation of application No. 10/123,445, filed on Apr. 15, 2002, now Pat. No. 8,073,967.

(51) Int. Cl.
*G06F 15/16* (2006.01)
*H04L 29/08* (2006.01)

(52) U.S. Cl.
CPC ............ *H04L 67/306* (2013.01); *H04L 67/125* (2013.01); *H04L 67/325* (2013.01);
(Continued)

(58) Field of Classification Search
CPC ... H04L 69/329; H04L 67/325; H04L 67/327; H04N 2201/003; G06F 15/16

USPC .............. 709/201, 246, 250, 203; 370/218
See application file for complete search history.

(56) References Cited

U.S. PATENT DOCUMENTS 3,096,434 A    7/1963    King
3,404,264 A    10/1968    Kugler
(Continued)

FOREIGN PATENT DOCUMENTS

CN    1007757 B    4/1990
CN    1097804     1/1995
(Continued)

OTHER PUBLICATIONS

Questioning for Japanese Appeal No. 2012-9863, mailed Aug. 28, 2012.
(Continued)

*Primary Examiner* — Tesfay Yohannes
(74) *Attorney, Agent, or Firm* — Marshall, Gerstein & Borun LLP

(57) ABSTRACT

A web services-based communication system and technique uses an information server to facilitate the communication of process control data and analysis results between a plurality of web services coupled to a communication network. A graphical user interface coupled to the network enables users to store user profile information and configuration information in a database within the information server. The information server uses the configuration information and the profile information to control the operations of a scheduler and a router within the information server to enable users to selectively view process control information via the graphical user interface and to route process control information to appropriate ones of the web services.

10 Claims, 11 Drawing Sheets

(52) U.S. Cl.
CPC ............ *H04L67/327* (2013.01); *H04L 69/329* (2013.01); *G05B 2219/31457* (2013.01); *G05B 2219/32128* (2013.01); *G05B 2219/32235* (2013.01)

(56) References Cited

U.S. PATENT DOCUMENTS

| | | |
|---|---|---|
| 3,701,280 A | 10/1972 | Stroman |
| 3,705,516 A | 12/1972 | Reis |
| 3,981,836 A | 9/1976 | Pangle, Jr. et al. |
| RE29,383 E | 9/1977 | Gallatin et al. |
| 4,058,275 A | 11/1977 | Banks et al. |
| 4,088,413 A | 5/1978 | Rossignol de la Ronde et al. |
| 4,099,413 A | 7/1978 | Ohte et al. |
| 4,322,976 A | 4/1982 | Sisson et al. |
| 4,337,516 A | 6/1982 | Murphy et al. |
| 4,408,285 A | 10/1983 | Sisson et al. |
| 4,425,798 A | 1/1984 | Nagai et al. |
| 4,435,770 A | 3/1984 | Shiohata et al. |
| 4,493,042 A | 1/1985 | Shima et al. |
| 4,517,468 A | 5/1985 | Kemper et al. |
| 4,527,271 A | 7/1985 | Hallee et al. |
| 4,530,234 A | 7/1985 | Cullick et al. |
| 4,607,325 A | 8/1986 | Horn |
| 4,635,214 A | 1/1987 | Kasai et al. |
| 4,642,782 A | 2/1987 | Kemper et al. |
| 4,644,478 A | 2/1987 | Stephens et al. |
| 4,644,749 A | 2/1987 | Somes |
| 4,649,515 A | 3/1987 | Thompson et al. |
| 4,657,179 A | 4/1987 | Aggers et al. |
| 4,683,542 A | 7/1987 | Taniguti et al. |
| 4,707,796 A | 11/1987 | Calabro et al. |
| 4,734,873 A | 3/1988 | Malloy et al. |
| 4,758,964 A | 7/1988 | Bittner et al. |
| 4,763,243 A | 8/1988 | Barlow et al. |
| 4,764,862 A | 8/1988 | Barlow et al. |
| 4,770,543 A | 9/1988 | Burghoff et al. |
| 4,777,585 A | 10/1988 | Kokawa et al. |
| 4,819,233 A | 4/1989 | Delucia et al. |
| 4,831,564 A | 5/1989 | Suga et al. |
| 4,843,557 A | 6/1989 | Ina et al. |
| 4,853,175 A | 8/1989 | Book, Sr. |
| 4,873,655 A | 10/1989 | Kondraske |
| 4,885,694 A | 12/1989 | Pray et al. |
| 4,885,707 A | 12/1989 | Nichol et al. |
| 4,907,167 A | 3/1990 | Skeirik |
| 4,910,691 A | 3/1990 | Skeirik |
| 4,922,412 A | 5/1990 | Lane et al. |
| 4,924,418 A | 5/1990 | Bachman et al. |
| 4,934,196 A | 6/1990 | Romano |
| 4,942,514 A | 7/1990 | Miyagaki et al. |
| 4,944,035 A | 7/1990 | Roger et al. |
| 4,956,793 A | 9/1990 | Bonne et al. |
| 4,964,125 A | 10/1990 | Kim |
| 4,965,742 A | 10/1990 | Skeirik |
| 4,980,844 A | 12/1990 | Demjanenko et al. |
| 4,992,965 A | 2/1991 | Holter et al. |
| 5,005,142 A | 4/1991 | Lipchak et al. |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,862 A | 8/1991 | Takahashi et al. |
| 5,043,863 A | 8/1991 | Bristol et al. |
| 5,050,095 A | 9/1991 | Samad |
| 5,053,815 A | 10/1991 | Wendell |
| 5,070,458 A | 12/1991 | Gilmore et al. |
| 5,081,598 A | 1/1992 | Bellows et al. |
| 5,089,978 A | 2/1992 | Lipner et al. |
| 5,089,984 A | 2/1992 | Struger et al. |
| 5,094,107 A | 3/1992 | Schoch |
| 5,098,197 A | 3/1992 | Shepard et al. |
| 5,099,436 A | 3/1992 | McCown et al. |
| 5,103,409 A | 4/1992 | Shimizu et al. |
| 5,111,531 A | 5/1992 | Grayson et al. |
| 5,121,467 A | 6/1992 | Skeirik |
| 5,122,976 A | 6/1992 | Bellows et al. |
| 5,130,936 A | 7/1992 | Sheppard et al. |
| 5,134,574 A | 7/1992 | Beaverstock et al. |
| 5,140,530 A | 8/1992 | Guha et al. |
| 5,142,612 A | 8/1992 | Skeirik |
| 5,148,378 A | 9/1992 | Shibayama et al. |
| 5,161,013 A | 11/1992 | Rylander et al. |
| 5,163,151 A | 11/1992 | Bronikowski et al. |
| 5,167,009 A | 11/1992 | Skeirik |
| 5,175,678 A | 12/1992 | Frerichs et al. |
| 5,187,674 A | 2/1993 | Bonne |
| 5,189,232 A | 2/1993 | Shabtai et al. |
| 5,193,143 A | 3/1993 | Kaemmerer et al. |
| 5,197,114 A | 3/1993 | Skeirik |
| 5,197,328 A | 3/1993 | Fitzgerald |
| 5,200,028 A | 4/1993 | Tatsumi et al. |
| 5,200,958 A | 4/1993 | Hamilton et al. |
| 5,210,704 A | 5/1993 | Husseiny |
| 5,212,765 A | 5/1993 | Skeirik |
| 5,214,582 A | 5/1993 | Gray |
| 5,224,203 A | 6/1993 | Skeirik |
| 5,228,780 A | 7/1993 | Shepard et al. |
| 5,235,527 A | 8/1993 | Ogawa et al. |
| 5,251,151 A | 10/1993 | Demjanenko et al. |
| 5,265,031 A | 11/1993 | Malczewski |
| 5,265,222 A | 11/1993 | Nishiya et al. |
| 5,274,572 A | 12/1993 | O'Neill et al. |
| 5,282,131 A | 1/1994 | Rudd et al. |
| 5,282,261 A | 1/1994 | Skeirik |
| 5,291,190 A | 3/1994 | Scarola et al. |
| 5,293,585 A | 3/1994 | Morita et al. |
| 5,301,101 A | 4/1994 | MacArthur et al. |
| 5,303,181 A | 4/1994 | Stockton |
| 5,305,230 A | 4/1994 | Matsumoto et al. |
| 5,311,421 A | 5/1994 | Nomura et al. |
| 5,311,447 A | 5/1994 | Bonne |
| 5,311,562 A | 5/1994 | Palusamy et al. |
| 5,315,521 A | 5/1994 | Hanson et al. |
| 5,317,520 A | 5/1994 | Castle |
| 5,325,522 A | 6/1994 | Vaughn |
| 5,327,357 A | 7/1994 | Feinstein et al. |
| 5,329,443 A | 7/1994 | Bonaquist et al. |
| 5,333,240 A | 7/1994 | Matsumoto et al. |
| 5,333,298 A | 7/1994 | Bland et al. |
| 5,347,449 A | 9/1994 | Meyer et al. |
| 5,349,541 A | 9/1994 | Alexandro, Jr. et al. |
| 5,351,184 A | 9/1994 | Lu et al. |
| 5,353,207 A | 10/1994 | Keeler et al. |
| 5,353,315 A | 10/1994 | Scarola et al. |
| 5,361,612 A | 11/1994 | Voiculescu et al. |
| 5,369,599 A | 11/1994 | Sadjadi et al. |
| 5,373,452 A | 12/1994 | Guha |
| 5,384,698 A | 1/1995 | Jelinek |
| 5,384,699 A | 1/1995 | Levy et al. |
| 5,386,373 A | 1/1995 | Keeler et al. |
| 5,390,287 A | 2/1995 | Obata |
| 5,390,326 A | 2/1995 | Shah |
| 5,392,226 A * | 2/1995 | Hamilton ........................ 702/81 |
| 5,394,341 A | 2/1995 | Kepner |
| 5,394,543 A | 2/1995 | Hill et al. |
| 5,396,415 A | 3/1995 | Konar et al. |
| 5,398,303 A | 3/1995 | Tanaka |
| 5,400,246 A | 3/1995 | Wilson et al. |
| 5,404,064 A | 4/1995 | Mermelstein et al. |
| 5,408,406 A | 4/1995 | Mathur et al. |
| 5,408,586 A | 4/1995 | Skeirik |
| 5,414,645 A | 5/1995 | Hirano et al. |
| 5,419,197 A | 5/1995 | Ogi et al. |
| 5,423,003 A | 6/1995 | Berteau |
| 5,430,642 A | 7/1995 | Nakajima et al. |
| 5,440,478 A | 8/1995 | Fisher et al. |
| 5,442,544 A | 8/1995 | Jelinek |
| 5,461,570 A | 10/1995 | Wang et al. |
| 5,467,355 A | 11/1995 | Umeda et al. |
| 5,469,735 A | 11/1995 | Watanabe et al. |
| 5,483,387 A | 1/1996 | Bauhahn et al. |
| 5,485,753 A | 1/1996 | Burns et al. |
| 5,486,920 A | 1/1996 | Killpatrick et al. |

(56) References Cited

U.S. PATENT DOCUMENTS

| | | |
|---|---|---|
| 5,486,995 A | 1/1996 | Krist et al. |
| 5,486,996 A | 1/1996 | Samad et al. |
| 5,488,697 A | 1/1996 | Kaemmerer et al. |
| 5,489,831 A | 2/1996 | Harris |
| 5,499,188 A | 3/1996 | Kline, Jr. et al. |
| 5,500,941 A | 3/1996 | Gil et al. |
| 5,504,863 A | 4/1996 | Yoshida et al. |
| 5,511,004 A | 4/1996 | Dubost et al. |
| 5,511,442 A | 4/1996 | Tame |
| 5,521,814 A | 5/1996 | Teran et al. |
| 5,521,842 A | 5/1996 | Yamada |
| 5,528,510 A | 6/1996 | Kraft |
| 5,533,413 A | 7/1996 | Kobayashi et al. |
| 5,537,310 A | 7/1996 | Tanake et al. |
| 5,541,833 A | 7/1996 | Bristol et al. |
| 5,546,301 A | 8/1996 | Agrawal et al. |
| 5,548,528 A | 8/1996 | Keeler et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,570,300 A | 10/1996 | Henry et al. |
| 5,572,420 A | 11/1996 | Lu |
| 5,574,638 A | 11/1996 | Lu |
| 5,586,066 A | 12/1996 | White et al. |
| 5,596,704 A | 1/1997 | Geddes et al. |
| 5,598,521 A | 1/1997 | Kilgore et al. |
| 5,600,148 A | 2/1997 | Cole et al. |
| 5,602,757 A | 2/1997 | Haseley et al. |
| 5,602,761 A | 2/1997 | Spoerre et al. |
| 5,604,914 A * | 2/1997 | Kabe ............................... 710/1 |
| 5,608,845 A | 3/1997 | Ohtsuka et al. |
| 5,610,339 A | 3/1997 | Haseley et al. |
| 5,623,598 A | 4/1997 | Voigt et al. |
| 5,625,574 A | 4/1997 | Griffiths et al. |
| 5,628,994 A | 5/1997 | Kaper et al. |
| 5,631,825 A | 5/1997 | van Weele et al. |
| 5,640,491 A | 6/1997 | Bhat et al. |
| 5,640,493 A | 6/1997 | Skeirik |
| 5,646,350 A | 7/1997 | Robinson et al. |
| 5,666,297 A | 9/1997 | Britt et al. |
| 5,671,335 A | 9/1997 | Davis et al. |
| 5,671,351 A | 9/1997 | Wild et al. |
| 5,675,504 A | 10/1997 | Serodes et al. |
| 5,680,409 A | 10/1997 | Qin et al. |
| 5,682,309 A | 10/1997 | Bartusiak et al. |
| 5,687,090 A | 11/1997 | Chen et al. |
| 5,691,895 A | 11/1997 | Kurtzberg et al. |
| 5,692,158 A | 11/1997 | Degeneff et al. |
| 5,698,788 A | 12/1997 | Mol et al. |
| 5,704,011 A | 12/1997 | Hansen et al. |
| 5,715,158 A | 2/1998 | Chen |
| 5,729,661 A | 3/1998 | Keeler et al. |
| 5,740,324 A | 4/1998 | Mathur et al. |
| 5,742,513 A | 4/1998 | Bouhenguel et al. |
| 5,754,451 A | 5/1998 | Williams |
| 5,757,371 A * | 5/1998 | Oran et al. ..................... 715/779 |
| 5,761,518 A | 6/1998 | Boehling et al. |
| 5,764,891 A | 6/1998 | Warrior |
| 5,768,119 A | 6/1998 | Havekost et al. |
| 5,777,872 A | 7/1998 | He |
| 5,781,432 A | 7/1998 | Keeler et al. |
| 5,781,878 A | 7/1998 | Mizoguchi et al. |
| 5,790,898 A | 8/1998 | Kishima et al. |
| 5,796,602 A | 8/1998 | Wellan et al. |
| 5,796,606 A | 8/1998 | Spring et al. |
| 5,796,609 A | 8/1998 | Tao et al. |
| 5,798,939 A | 8/1998 | Ochoa et al. |
| 5,805,442 A | 9/1998 | Crater et al. |
| 5,809,490 A | 9/1998 | Guiver et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,838,561 A | 11/1998 | Owen |
| 5,842,189 A | 11/1998 | Keeler et al. |
| 5,847,952 A | 12/1998 | Samad |
| 5,848,365 A | 12/1998 | Coverdill |
| 5,855,791 A | 1/1999 | Hays et al. |
| 5,859,773 A | 1/1999 | Keeler et al. |
| 5,859,885 A | 1/1999 | Rusnica et al. |
| 5,859,964 A | 1/1999 | Wang et al. |
| 5,875,420 A | 2/1999 | Piety et al. |
| 5,877,954 A | 3/1999 | Klimasauskas et al. |
| 5,880,716 A | 3/1999 | Kunugi et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,903,455 A | 5/1999 | Sharpe, Jr. et al. |
| 5,905,989 A | 5/1999 | Biggs |
| 5,906,214 A | 5/1999 | Gueret et al. |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,909,671 A | 6/1999 | Byford et al. |
| 5,914,875 A | 6/1999 | Monta et al. |
| 5,918,233 A | 6/1999 | La Chance et al. |
| 5,922,963 A | 7/1999 | Piety et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,951,654 A * | 9/1999 | Avsan et al. ..................... 710/5 |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 5,995,916 A | 11/1999 | Nixon et al. |
| 5,997,167 A | 12/1999 | Crater et al. |
| 6,006,171 A | 12/1999 | Vines et al. |
| 6,008,985 A | 12/1999 | Lake et al. |
| 6,014,612 A | 1/2000 | Larson et al. |
| 6,017,143 A | 1/2000 | Eryurek et al. |
| 6,026,352 A | 2/2000 | Burns et al. |
| 6,033,257 A | 3/2000 | Lake et al. |
| 6,035,339 A * | 3/2000 | Agraharam et al. .......... 709/246 |
| 6,038,486 A | 3/2000 | Saitoh et al. |
| 6,038,540 A | 3/2000 | Krist et al. |
| 6,041,263 A | 3/2000 | Boston et al. |
| 6,047,220 A | 4/2000 | Eryurek |
| 6,047,221 A | 4/2000 | Piche et al. |
| 6,055,483 A | 4/2000 | Lu |
| 6,061,603 A | 5/2000 | Papadopoulos et al. |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Havlena et al. |
| 6,108,616 A | 8/2000 | Borchers et al. |
| 6,110,214 A | 8/2000 | Klimasauskas |
| 6,119,047 A | 9/2000 | Eryurek et al. |
| 6,122,555 A | 9/2000 | Lu |
| 6,128,279 A | 10/2000 | O'Neil et al. |
| 6,134,574 A | 10/2000 | Oberman et al. |
| 6,144,952 A | 11/2000 | Keeler et al. |
| 6,169,980 B1 | 1/2001 | Keeler et al. |
| 6,185,470 B1 | 2/2001 | Pado et al. |
| 6,197,480 B1 | 3/2001 | Iguchi et al. |
| 6,246,972 B1 | 6/2001 | Klimasauskas |
| 6,259,959 B1 | 7/2001 | Martin |
| 6,266,726 B1 | 7/2001 | Nixon et al. |
| 6,298,377 B1 | 10/2001 | Hartikainen et al. |
| 6,298,454 B1 | 10/2001 | Schleiss et al. |
| 6,317,638 B1 | 11/2001 | Schreder et al. |
| 6,317,701 B1 | 11/2001 | Pyotsia et al. |
| 6,332,110 B1 | 12/2001 | Wolfe |
| 6,389,331 B1 | 5/2002 | Jensen et al. |
| 6,397,114 B1 | 5/2002 | Eryurek |
| 6,400,681 B1 * | 6/2002 | Bertin et al. ................... 370/218 |
| 6,418,465 B1 * | 7/2002 | Hirosawa et al. ............. 709/206 |
| 6,421,571 B1 | 7/2002 | Spriggs et al. |

(56) References Cited

U.S. PATENT DOCUMENTS

| | | |
|---|---|---|
| 6,434,435 B1 | 8/2002 | Tubel et al. |
| 6,443,435 B1 | 9/2002 | Hendrickson |
| 6,445,963 B1 | 9/2002 | Blevins et al. |
| 6,507,797 B1 | 1/2003 | Kliman et al. |
| 6,529,780 B1 | 3/2003 | Soergel et al. |
| 6,532,392 B1 | 3/2003 | Eryurek et al. |
| 6,535,769 B1 | 3/2003 | Konar et al. |
| 6,539,267 B1 | 3/2003 | Eryurek et al. |
| 6,549,130 B1 | 4/2003 | Joao |
| 6,567,718 B1 | 5/2003 | Campbell et al. |
| 6,571,273 B1 * | 5/2003 | Shirai et al. ........... 709/201 |
| 6,591,260 B1 * | 7/2003 | Schwarzhoff et al. ........ 1/1 |
| 6,604,132 B1 * | 8/2003 | Hitt ........................ 709/206 |
| 6,609,040 B1 | 8/2003 | Brunnemann et al. |
| 6,615,090 B1 | 9/2003 | Blevins et al. |
| 6,628,994 B1 | 9/2003 | Turicchi, Jr. et al. |
| 6,633,782 B1 | 10/2003 | Schleiss et al. |
| 6,651,012 B1 | 11/2003 | Bechhoefer |
| 6,654,697 B1 | 11/2003 | Eryurek et al. |
| 6,681,155 B1 | 1/2004 | Fujita et al. |
| 6,690,274 B1 | 2/2004 | Bristol |
| 6,704,689 B1 | 3/2004 | Hogan et al. |
| 6,717,513 B1 | 4/2004 | Sandelman et al. |
| 6,721,609 B1 | 4/2004 | Wojsznis et al. |
| 6,732,191 B1 * | 5/2004 | Baker et al. ............. 710/1 |
| 6,738,388 B1 | 5/2004 | Stevenson et al. |
| 6,758,168 B2 | 7/2004 | Koskinen et al. |
| 6,760,782 B1 * | 7/2004 | Swales ................... 709/250 |
| 6,774,786 B1 | 8/2004 | Havekost et al. |
| 6,892,317 B1 | 5/2005 | Sampath et al. |
| 6,965,855 B1 | 11/2005 | Burbridge et al. |
| 6,968,389 B1 | 11/2005 | Menditto et al. |
| 7,079,984 B2 | 7/2006 | Eryurek et al. |
| 7,120,917 B2 | 10/2006 | Feist |
| 7,206,646 B2 | 4/2007 | Nixon et al. |
| 7,461,171 B2 * | 12/2008 | Thurner ................... 709/246 |
| 7,720,727 B2 | 5/2010 | Keyes et al. |
| 8,073,967 B2 | 12/2011 | Peterson et al. |
| 2002/0022894 A1 | 2/2002 | Eryurek et al. |
| 2002/0029130 A1 | 3/2002 | Eryurek et al. |
| 2002/0038156 A1 | 3/2002 | Eryurek et al. |
| 2002/0067370 A1 | 6/2002 | Forney et al. |
| 2002/0077711 A1 | 6/2002 | Nixon et al. |
| 2002/0095522 A1 * | 7/2002 | Hayko et al. ............ 709/311 |
| 2002/0124100 A1 * | 9/2002 | Adams .................... 709/232 |
| 2002/0147511 A1 | 10/2002 | Eryurek et al. |
| 2002/0156838 A1 | 10/2002 | Batke et al. |
| 2002/0161940 A1 | 10/2002 | Eryurek et al. |
| 2002/0163427 A1 | 11/2002 | Eryurek et al. |
| 2002/0199014 A1 * | 12/2002 | Yang et al. .............. 709/238 |
| 2003/0002969 A1 | 1/2003 | Risser |
| 2003/0009572 A1 | 1/2003 | Thurner |
| 2003/0014500 A1 | 1/2003 | Schleiss et al. |
| 2003/0028268 A1 | 2/2003 | Eryurek et al. |
| 2003/0065409 A1 | 4/2003 | Raeth et al. |
| 2003/0195934 A1 | 10/2003 | Peterson et al. |
| 2003/0208297 A1 | 11/2003 | Stawikowski et al. |
| 2003/0236579 A1 | 12/2003 | Hauhia et al. |
| 2004/0075689 A1 | 4/2004 | Schleiss et al. |
| 2004/0095237 A1 | 5/2004 | Chen et al. |
| 2004/0181364 A1 | 9/2004 | Reeves et al. |
| 2004/0249583 A1 | 12/2004 | Eryurek et al. |
| 2005/0007249 A1 | 1/2005 | Eryurek et al. |
| 2005/0015624 A1 | 1/2005 | Ginter et al. |
| 2005/0240289 A1 | 10/2005 | Hoyte et al. |

FOREIGN PATENT DOCUMENTS

| | | |
|---|---|---|
| CN | 1142303 A | 2/1997 |
| CN | 1227689 A | 9/1999 |
| CN | 1267373 A | 9/2000 |
| DE | 35 40 204 | 9/1986 |
| DE | 40 08 560 | 9/1990 |
| DE | 44 33 593 | 6/1995 |
| DE | 195 02 499 | 8/1996 |
| DE | 199 62 230 A1 | 6/2001 |
| EP | 0 122 622 | 10/1984 |
| EP | 0 362 386 | 4/1990 |
| EP | 0 377 736 | 7/1990 |
| EP | 0 413 814 | 2/1991 |
| EP | 0 487 419 A2 | 5/1992 |
| EP | 0 594 227 | 4/1994 |
| EP | 0 612 039 A2 | 8/1994 |
| EP | 0 624 847 | 11/1994 |
| EP | 0 626 697 | 11/1994 |
| EP | 0 644 470 A2 | 3/1995 |
| EP | 0 827 096 | 3/1998 |
| EP | 0 959 398 | 11/1999 |
| EP | 0 961 184 | 12/1999 |
| EP | 0 964 325 | 12/1999 |
| EP | 0 965 897 A1 | 12/1999 |
| EP | 1 160 691 A2 | 12/2001 |
| GB | 2 083 258 A | 3/1982 |
| GB | 2 294 129 A | 4/1996 |
| GB | 2 294 793 A | 5/1996 |
| GB | 2 347 234 | 8/2000 |
| GB | 2 380 833 | 4/2003 |
| GB | 2 404 457 A | 2/2005 |
| JP | 02-197902 | 8/1990 |
| JP | 04-220521 | 8/1992 |
| JP | 05-122853 | 5/1993 |
| JP | 05-149763 A | 6/1993 |
| JP | 6-121379 A | 4/1994 |
| JP | 06-125584 A | 5/1994 |
| JP | 06-242192 | 9/1994 |
| JP | 06-331507 | 12/1994 |
| JP | 07-234988 | 9/1995 |
| JP | 8-249054 A | 9/1996 |
| JP | 08-261886 | 10/1996 |
| JP | 09-200262 | 7/1997 |
| JP | 10-039728 | 2/1998 |
| JP | 10-260821 | 9/1998 |
| JP | 10-320039 | 12/1998 |
| JP | 11-231924 | 8/1999 |
| JP | 11-355325 A | 12/1999 |
| JP | 2000-067015 | 3/2000 |
| JP | 2000-078750 A | 3/2000 |
| JP | 2000-137504 A | 5/2000 |
| JP | 2000-172329 A | 6/2000 |
| JP | 2000-242864 A | 9/2000 |
| JP | 2000-305620 | 11/2000 |
| JP | 2001-016662 | 1/2001 |
| JP | 2001-022430 A | 1/2001 |
| JP | 2001-044997 A | 2/2001 |
| JP | 2001-134301 A | 5/2001 |
| JP | 2001-216423 A | 8/2001 |
| JP | 2001-265821 A | 9/2001 |
| JP | 2001-350507 A | 12/2001 |
| JP | 2002-015376 A | 1/2002 |
| JP | 2002-26932 | 1/2002 |
| JP | 2002-42283 | 2/2002 |
| JP | 2002-315082 A | 10/2002 |
| JP | 2002-323922 A | 11/2002 |
| JP | 2003-058206 A | 2/2003 |
| JP | 2004-510275 A | 4/2004 |
| RU | 94-030327 | 6/1996 |
| RU | 2103668 | 1/1998 |
| RU | 2114456 | 6/1998 |
| RU | 2154853 | 8/2000 |
| RU | 2178578 | 1/2002 |
| WO | WO-98/38585 A1 | 9/1998 |
| WO | WO-99/13418 | 3/1999 |
| WO | WO-00/50851 | 8/2000 |
| WO | WO-01/08054 A2 | 2/2001 |
| WO | WO-02/23405 | 3/2002 |
| WO | WO-02/095633 A2 | 11/2002 |
| WO | WO-03/019304 A1 | 3/2003 |
| WO | WO-03/075206 | 9/2003 |

(56) References Cited

FOREIGN PATENT DOCUMENTS

| WO | WO 02/27704 | 4/2004 |
|----|-------------|--------|
| WO | WO-2004/068026 A2 | 8/2004 |

OTHER PUBLICATIONS

Parker et al., Distribution System for Structured Information (2001).
Notice of Reasons for Rejection for Japanese Application No. 2008-17965, dated Nov. 9, 2010.
Kim et al., "Web E-Speak: Facilitating Web-Based E-Services," Multimedia, IEEE 9(1):43-55 (2002).
Dayal et al., "Business Process Coordination: State of the Art, Trends, and Open Issues," *Proceedings of the 27th International Conference on Very Large Data Bases*, pp. 3-13 (2001).
Kuno et al., "My Agent Wants to Talk to Your Service: Personalizing Web Services Through Agents," *Proceedings of the First International Workshop on Challenges in Open Agent Systems* (2002). Retrieved from the Internet on Apr. 22, 2010: <URL:http://www.hpl.hp.com/techreports/2002/HPL-2002-114.pdf>.
Graupner et al., "E-Speak: An Enabling Infrastructure for Web-Based E-Services," Proceedings of International Conferences on Advances in Infrastructure for Electronic Business (2000). Retrieved from the Internet: <URL:http://yangtze.cs.uiuc.edu/~wooyoung/espeak-ssgrr.pdf>.
Sheldon et al., "Discover: A Resource Discovery System Based on Content Routing," Proc. 3rd International World Wide Web Conference (1995).
English-language translation of First Office Action for Chinese Application No. 2010102701455, received Aug. 22, 2011.
Questioning for Japanese Appeal No. 2011-19471, mailed Nov. 29, 2011.
Decision of Rejection for Japanese Application No. 2009-1227, dated Feb. 28, 2012.
Woitsch et al., "Process-Oriented Knowledge Management Systems Based on KM-Services: The Promote Approach," Proceedings of the International Conferences on Practical Aspects of Knowledge Management, pp. 398-412 (2002).
Second Office Action for Chinese Application No. 03110485.1, dated Oct. 26, 2007.
Notice of Reasons of Rejection for Japanese Application No. 2009-1227, dated Aug. 2, 2011.
Notice of Reasons for Rejection for corresponding JP Application No. 2011-173168 dated Nov. 5, 2013, 5 pages.
Notice of Reasons for Rejection for corresponding JP Application No. 2011-173168 dated Dec. 25, 2012, 6 pages.
Notice of Reasons for Rejection for Japanese Application No. 2012-9863, dated Jul. 9, 2013.
Office Action for Chinese Application No. 201210069517.7, dated Jul. 11, 2014.
Japanese Office Action dated Jul. 22, 2014 for JP2011-173168, 5 pages.
"Components of GE Predictor™ Services," GE Industrial Systems, available at http://www.geindustrial.com/cwc/services?id=74 on Jul. 18, 2002.
"Customer Benefits," GE Industrial Systems, available at http://www.geindustrial.com/cwc/services?id=75 on Jul. 18, 2002.
"Customer Impact," GE Industrial Systems, available at http://www.geindustrial.com/cwc/services?id=73 on Jul. 18, 2002.
"Electrical Equipment Coverage," GE Industrial Systems, available at http://www.geindustrial.com/cwc/services?id=72 on Jul. 18, 2002.
"GE Predictor™ Services: GE Predictor Services Overview," GE Industrial Systems, available at http://www.geindustrial.com/cwc/services?id=71 on Jul. 18, 2002.
Bray et al., "Practical Alarm Filtering," *Intech*, 41(2):34-36 (1994).
Communication Pursuant to Article 96(2) EPC issued in 02 719 088.3-2206 application by the European Patent Office on Sep. 29, 2004.
Communication pursuant to Article 96(2) EPC issued in 02 723 258.6-2206 application by the European Patent Office on Sep. 28, 2004.
dotnet.za.net, "Web Services—A Guide for Business and IT Managers (Sep. 23, 2001)", (Copyright 2001), www.dotnet.za.net.
English-language translation of Third Office Action for Chinese Application No. 200410103816.3, dated Nov. 7, 2009.
European Examination Report under Section 94(3) for Application No. 05714115.2, dated Nov. 5, 2010.
European Examination Report, issued in EP 02717514.0, dated Jun. 29, 2004.
European Examination Report, issued in EP 02723319.6, dated Jul. 1, 2004.
European Office Action for Application No. 03743708, dated Feb. 2, 2010.
Examination Report under Section 18(3) issued in GB 0212610.0 application by the United Kingdom Patent Office on Sep. 16, 2004.
Examination Report under Section 18(3) issued in GB 0308687.3 application by the United Kingdom Patent Office on Mar. 11, 2005.
Examination Report under Section 18(3) issued in GB 0308687.9 by the United Kingdom Patent Office on Mar. 11, 2005.
Examination Report under Section 18(3) issued in GB 0416908.2 application by the United Kingdom Patent Office on Jun. 27, 2006.
First Office Action issued in Chinese Application No. 02122060.3 on Feb. 4, 2005.
First Office Action issued in Chinese Application No. 02805785.6 on Nov. 11, 2005.
First Office Action issued in Chinese Application No. 02805854.2 on Nov. 11, 2005.
First Office Action issued in Chinese Application No. 200580006879.X on Jan. 25, 2008.
First Office Action issued in Russian Application No. 2006133968/09 mailed May 6, 2009, and English translation thereof.
Fritch W., Primenenie mikroprocessorov v sistemah upravleniya, Moskwa, Mir, 1984 (D1, pp. 68-74).
International Preliminary Examination Report for PCT/US02/15901, mailed Sep. 10, 2003.
International Preliminary Examination Report for PCT/US2005/006155 dated Sep. 5, 2006.
International Preliminary Examination Report for PCT/US2005/006319 dated Sep. 5, 2006.
International Preliminary Examination Report for PCT/US2005/006325 dated Sep. 5, 2006.
International Preliminary Examination Report issued in PCT/US02/05874, European Patent Office, dated Feb. 3, 2003.
International Preliminary Examination Report of PCT/US02/05874, mailed Feb. 3, 2003.
International Search Report for PCT/US02/15901, mailed Jun. 17, 2003.
International Search Report for PCT/US2005/006319, mailed Sep. 16, 2005.
International Search Report for PCT/US2005/006325, mailed Sep. 5, 2005.
International Search Report for PCT/US2005/06155, mailed Sep. 5, 2005.
International Search Report issued in PCT/US02/15901, European Patent Office, mailed Jun. 17, 2003.
International Search Report of PCT/US02/05874, European Patent Office, mailed Nov. 13, 2002.
International Search Report of PCT/US02/05874, mailed Nov. 13, 2002.
Kalkhoff, "Agent-Oriented Robot Task Transformation," Proceedings of the International Symposium on Intelligent Control, IEEE, pp. 242-247 (Aug. 27, 1995).
Lighthammer Illuminator™ Manufacturing Intelligence Brochure "Now you can see all your manufacturing information from a single interface—in real-time, from anywhere."
Lighthammer Software Development, "Illuminator™ the 1st 'Plant Information Portal'™" (Copyright 1999).
Mazeda et al., "Supervision and Optimised Process Control in Sugar Beet Factories," Centre of Sugar Technology, Spain from www.univ-reims.fr/externes/avh10mazaeda.pdf.
Mehta et al., "Feedforward Neural Networks for Process Identification and Prediction," presented at ISA 2001, Houston, Texas, Sep. 2001.

(56) References Cited

OTHER PUBLICATIONS

Moskwa, Mir, A method for gathering data associated with a process plant is known from Fritch W. Primenenie mikroprocesssorov v sistemah upravleniya, (1994).

Namur Worksheet, "Status Signals of Field Instruments," NA 64, Feb. 1, 2001, pp. 1-8.

Notice of Allowance from U.S. Appl. No. 10/971,361 dated Feb. 27, 2006.

Notice of Reasons for Rejection for Application No. 2003-145503, dated Dec. 11, 2007.

Notice of Reasons for Rejection for Japanese Application No. 2003-573590, dated Dec. 1, 2009.

Notice of Rejection for Application No. 2002-570030, dated Jun. 19, 2007.

Notice of Rejection for Application No. 2002-591920, dated Jun. 12, 2007.

Notice of Rejection for Japanese Application No. 2004-219552, dated May 13, 2010.

Office Action for Japanese Application No. 2011-173168, dated Dec. 25, 2012.

Office Action for Japanese Application No. 2012-14052, dated Jan. 8, 2013.

Office Action for Japanese Application No. 2012-9863, dated Dec. 18, 2012.

Office Action for Japanese Patent Application No. 2003-573590, received Dec. 9, 2008.

Office Action for related Russian Application No. 2006133970/09(036945), dated Jun. 11, 2009.

Office Action for U.S. Appl. No. 10/971,361 mailed Sep. 26, 2005.

Partial International Search Report for PCT/US2005/006325 mailed Jul. 8, 2005.

U.S. Appl. No. 60/273,164, dated Mar. 1, 2001, "Asset Utilization Expert in a Process Control Plant."

U.S. Appl. No. 60/491,066, dated Jul. 20, 2003, "Economic Calculations in a Process Control System."

Russian examiner's Decision on Grant and English translation thereof.

Search Report under Section 17 issued in GB 0308687.3 application by the United Kingdom Patent Office on Aug. 28, 2003.

Search Report under Section 17 issued in GB 0308687.9 by the United Kingdom Patent Office on Aug. 28, 2003.

Search Report under Section 17(5) issued in GB 0416908.2 application by the United Kingdom Patent Office on Oct. 13, 2004.

Search Report under Section 17(5) issued in GB 0416908.2 application by United Kingdom Patent Office on Oct. 13, 2004.

Search Report under Section 17) issued in GB 0308687.9 by the United Kingdom Patent Office on Aug. 29, 2003.

Second Office Action issued in Chinese Application No. 200580006879.X, dated Sep. 12, 2008.

Second Office Action issued in Russian Application No. 2006133970/09(036945), dated Nov. 9, 2009.

Supplementary European Search Report for Application No. 03743708, dated Oct. 8, 2009.

Systinet, "Introduction to Web Services", (Copyright 2001, 2002), www.systinet.com.

Tzovla et al., "Abnormal Condition Management Using Expert Systems," presented at ISA 2001, Houston, Texas, Sep. 2001.

U.S. Appl. No. 60/273,164, filed Mar. 1, 2001, "Asset Utilization Expert in a Process Control Plant."

Web Services Architect, "What are Web Services", www.webservicesarchitect.com.

Written Opinion for PCT/US02/15901, mailed Jul. 16, 2003.

Written Opinion for PCT/US2005/006319, mailed Sep. 16, 2005.

Written Opinion for PCT/US2005/006325, mailed Sep. 5, 2005.

Written Opinion for PCT/US2005/06155, mailed Sep. 5, 2005.

Written Opinion issued in PCT/US02/05874, European Patent Office, mailed Nov. 13, 2002.

Written Opinion issued in PCT/US02/15901, European Patent Office, mailed Jul. 16, 2003.

Written Opinion of PCT/US02/05874, mailed Nov. 13, 2002.

Zolera Systems, "A Brief Guide to Web Services Protocols" (Copyright 2001), www.zolera.com.

Office Action for Chinese Application No. 201210069517.7, dated Apr. 7, 2015.

\* cited by examiner

Fig. 7
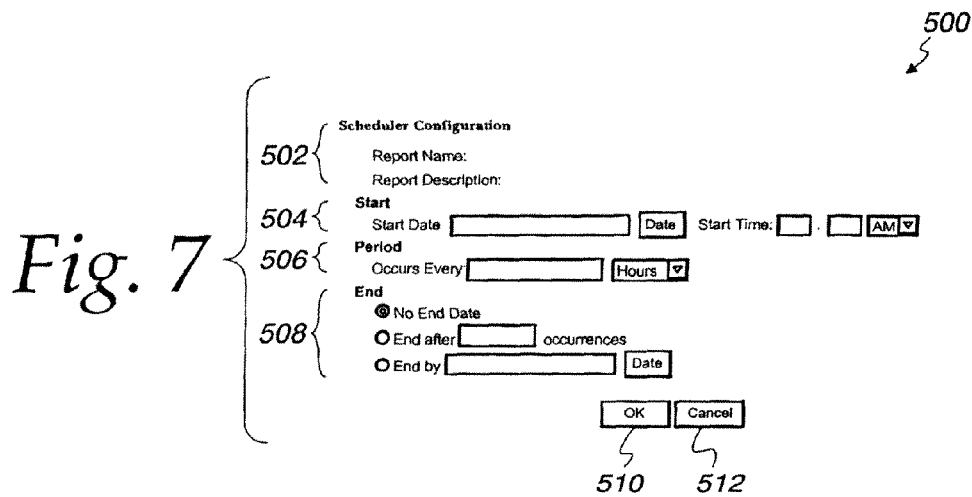
Fig. 8
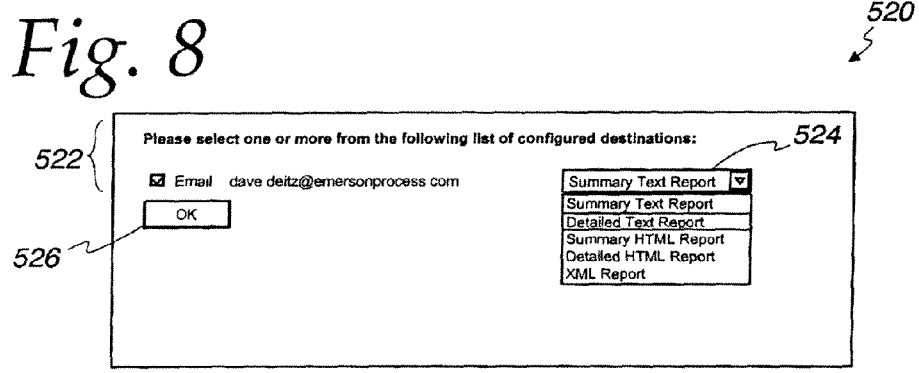
Fig. 9

Fig. 19

WEB SERVICES-BASED COMMUNICATIONS FOR USE WITH PROCESS CONTROL SYSTEMS

CROSS-REFERENCE TO RELATED APPLICATION

This application is a continuation of and claims the benefit of priority to U.S. patent application Ser. No. 10/123,445, entitled "Web Services-Based Communications for Use with Process Control Systems," filed Apr. 15, 2002 which is related to copending U.S. patent application Ser. No. 09/902,201, entitled "Transactional Data Communications for Process Control Systems," filed on Jul. 10, 2001, the entire disclosures of which are hereby incorporated herein.

FIELD OF TECHNOLOGY

The invention relates generally, to process control systems and, more particularly, the invention relates to the use of web services to facilitate communications between a process control system or plant and a plurality of data consuming applications.

DESCRIPTION OF THE RELATED ART

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Typically, a process control system operates within a business enterprise that may include several process control plants, component and/or service suppliers and customers, all of which may be distributed throughout a large geographic area, or in some cases, throughout the world. The process control plants, suppliers and customers may communicate with each other using a variety of communication media and technologies or platforms such as, for example, the Internet, satellite links, ground-based wireless transmissions, telephone lines, etc. Of course, the Internet has become a preferred communication platform for many business enterprises because the communications infrastructure is established, making the communication infrastructure costs for an enterprise near zero, and the technologies used to communicate information via the Internet are well-understood, stable, secure, etc.

Each process control plant within an enterprise may include one or more process control systems as well as a number of other business-related or information technology systems, which are needed to support or maintain or which are complementary to the operation of the process control systems. In general, the information technology systems within a process control plant may include manufacturing execution systems such as, for example, a maintenance management system and may also include enterprise resource planning systems such as, for example, scheduling, accounting and procurement systems. Although these information technology systems may be physically located within or near a plant, in some cases a few or possibly all of these systems may be remotely located with respect to the plant and may communicate with the plant using the Internet or any other suitable communication link. In any event, to improve or optimize the overall operation of an enterprise, some recent development efforts have been directed to facilitating more rapid and efficient communications and enabling more complete integration between process control systems and information technology systems within an enterprise.

Each process control plant may also include user-interactive applications that may be executed on a server or workstation that is communicatively coupled to one or more servers, workstations, or other computers that coordinate or perform the activities of the process control system within the plant. Such user-interactive applications may perform campaign management functions, historical data management functions, asset management functions, batch management functions, etc. In addition, each of the process control systems within a plant may include process management applications that may, for example, manage the communications of and provide information relating to alarm and/or other process events, provide information or data relating to the condition of the process or processes being performed by the process control plant, provide information or data relating to the condition or performance of equipment associated with the process control plant, etc. In particular, process management applications may include vibration monitoring applications, real-time optimization applications, expert system applications, predictive maintenance applications, control loop monitoring applications, or any other applications related to controlling, monitoring and/or maintaining a process control system or plant. Still further, a process control plant or enterprise may include one or more communication applications that may be used to communicate information from the process control system or plant to a user via a variety of different communication media and platforms. For example, these communication applications may include email applications, paging applications, voice messaging applications, file-based applications, etc., all of which may be adapted to send information via a wireless or hardwired media to a desktop computer, a laptop computer, a personal data assistant, a cellular phone or pager, or any other type of device or hardware platform.

Generally speaking, the effective integration of information technology systems, user-interactive applications, process management applications and communication applications has been extremely difficult, if not impossible, because these systems and applications are typically distributed widely throughout an enterprise and, in some cases, are widely geographically dispersed. Additionally, these systems and applications typically require the development of a custom communication interface or software driver that enables the different systems and applications to communicate with each other. As a result, when any system, application, device or component within the enterprise changes due to, for example, a firmware upgrade, device replacement, etc., the custom communication driver or interface for that system, device or component may also have to be changed. Obviously, the large number of custom drivers needed results in a lot of time-consuming driver maintenance, which results in high enterprise maintenance costs. Furthermore, adding a system or application to an enterprise or a process control plant often requires an enormous programming effort because a plurality of custom communication drivers or interfaces may have to be developed to enable the new system or application to communicate with the other systems and applications within the enterprise. Thus, systems that use such custom communication interfaces are not very flexible or scalable and do not facilitate, for example, the integration of a process control system with other systems and applications, which may be provided by the manufacturer of the process control system or which may be provided by a third party manufacturer or developer.

In addition to the difficulty associated with enabling communications between the large number of different systems, applications and services that make up an enterprise, there has been a pervasive problem associated with enabling system users or operators to effectively view or monitor selected enterprise information that pertains specifically to their role within the enterprise and/or their personal preferences. For example, an engineer may be concerned with the operation of a particular control loop within a particular portion of a process plant, whereas an executive officer may be concerned with overall production output of a particular plant or plants and typically would not want to see any details related to control loops, devices, etc.

Still another difficulty associated with present systems is the inability of these systems to enable system users or operators to configure and/or add applications, services or systems to the enterprise or process control plant. To the contrary, these present systems typically require the services of a skilled programmer to configure and/or integrate an application, service or system that has not been previously configured or integrated. For example, the skilled programmer may have to have intimate knowledge of how the application, service or system to be configured and/or integrated operates and may have to generate a configuration routine or routines and one or more custom communication drivers or interfaces that enable that system, application or service to communicate with other systems, applications or services within the enterprise.

Some recent development efforts have focused on using extensible markup languages to facilitate communications between the different applications, systems and services that make up an enterprise. It is generally known that extensible markup languages such as, for example, XML, may be used to enable different systems, applications and/or services to be loosely coupled to each other so that each of the different systems, applications and/or services do not have to have intimate knowledge of how the other systems, applications and/or services function to communicate with them. Some recently developed systems may combine the use of XML with network communication protocols such as simple object access protocol (SOAP) and network transport protocols such as, for example, hypertext transport protocol (HTTP) to enable these loosely coupled services, applications, and/or systems to communicate via a network such as, for example, the Internet.

Recently developed products that use XML, SOAP, and/or HTTP, etc. to enable communications between a variety of systems, applications and services within an enterprise typically only provide limited information exchange between information technology systems, limited configuration capabilities, limited scalability or flexibility to add services, systems or applications, and limited information viewing capabilities. Lighthammer Software Development Corporation markets one such commercially available product as Illuminator™. In general, many of these recently developed products are commonly referred to as portal applications (as is the Illuminator™ product). Such portal applications enable selective viewing of information centrally gathered and processed by a server or the like from a plurality of systems, applications and/or services within an enterprise.

While these recently developed portal applications and, in particular the Illuminator product, may facilitate communications between different systems, applications and services within an enterprise, they typically do not enable a user or system operator to easily add a system, service or application to the enterprise. Nor do these recently developed portal applications enable a system user or operator to selectively display information gathered from a plurality of other applications, services and systems within the enterprise based on a detailed profile associated with that particular user or operator. Instead, these portal applications merely enable a user to select one from a relatively few predetermined information display configurations that are based on organizational role or department such as, for example, engineering, management, manufacturing, etc.

Additionally, these known portal applications (e.g., the Illuminator product) typically collect or aggregate enormous amounts of data from various data providing entities within a process plant, regardless of whether or not any user or operator desires to view such data or otherwise make use of such data. For example, these known portal applications may centrally aggregate all available data within a database of a server or other computer system that is communicatively coupled to the various data sources. The central server or other computer system may then perform various types of analyses on the aggregated data and may send some or all of the collected data and analysis results to a viewing application that displays information to a user. Unfortunately, the data aggregation techniques used by these known portal applications results in the transmission of an enormous amount of data, which may or may not be needed by a user or users, via a communication network such as, for example, the Internet, which makes it difficult, if not impossible, for data to be sent in a real-time or otherwise timely manner.

Furthermore, because the server performing the data aggregation also performs any needed analysis on the aggregated data, a substantial amount of the processing resources of the server may be consumed by such analysis, regardless of whether the analysis results are requested or needed by a user. Still further, because known portal applications centrally aggregate data to be displayed or otherwise conveyed to users, a communications or power failure within the server performing the aggregation function may result in a catastrophic failure that completely prevents the exchange of information between systems, applications and/or services within the enterprise until power and/or communications to the central server are restored, all data has been recollected or aggregated and any needed analysis has be re-executed. In other words, the system architecture used by these known portal applications, which uses a central sever for data aggregation and analysis purposes, does not provide a robust environment for the integration of the systems, applications and/or services within an enterprise.

SUMMARY

In accordance with one aspect of the invention, a method of communicating process control information may send a message containing the process control information from a first web service associated with a process control system to an information server. The method may use a router within the information server to process the message to determine a destination for the process control information contained therein. Additionally, the method may send the process control information to a second web service associated with the destination and a data consuming application.

In accordance with another aspect of the invention, a system for communicating process control information may include a first web service associated with a process control system and a second web service associated with a data consuming application. The system may also include an information server communicatively coupled to the first and second web services via a network. The information server may be adapted to receive a message containing the process control information from the first web service and to send the process control information via the network to the second web service to be used by the data consuming application.

In accordance with still another aspect of the invention, a method of communicating process control information may send a request for the process control information to a first web service associated with a process control system and may select only the process control information from process control information available to the first web service based on the request for the process control information. The method may also send the process control information to an information server and may send the process control information from the information server to a second web service associated with a data consuming application.

In accordance with yet another aspect of the invention, a method of communicating process control information may send a first message containing the process control information from a first web service to an information server in response to a change in the process control information. The method may also process the first message within the information server to determine a second web service to which the process control information is to be sent and may send a second message containing the process control information from the information server to the second web service.

In accordance with still another aspect of the invention, a system for communicating process control information may include a computer readable medium and software stored on the computer readable medium and adapted to be executed by a processor. When executed, the software may cause the processor to establish connections with a plurality of web services via a network and to communicate the process control information from a first one of the plurality of web services to a second one of the plurality of web services via the network based on routing information and in response to one of a change in the process control information and a scheduled request for the process control information.

In accordance with still another aspect of the invention, a method of communicating process control information may receive user profile information from a graphical user interface and may receive web service configuration information from the graphical user interface. In addition, the method may store the user profile information and the web service configuration information in a database, may request the process control information from a web service associated with a process control system based on the user profile information and the web service configuration information and may send the process control information to the graphical user interface.

BRIEF DESCRIPTION OF THE DRAWINGS

FIGS. 5-20 are examples of views that may be displayed to a user by the graphical user interface shown in FIGS. 1 and 2.

DESCRIPTION

Figure 1:
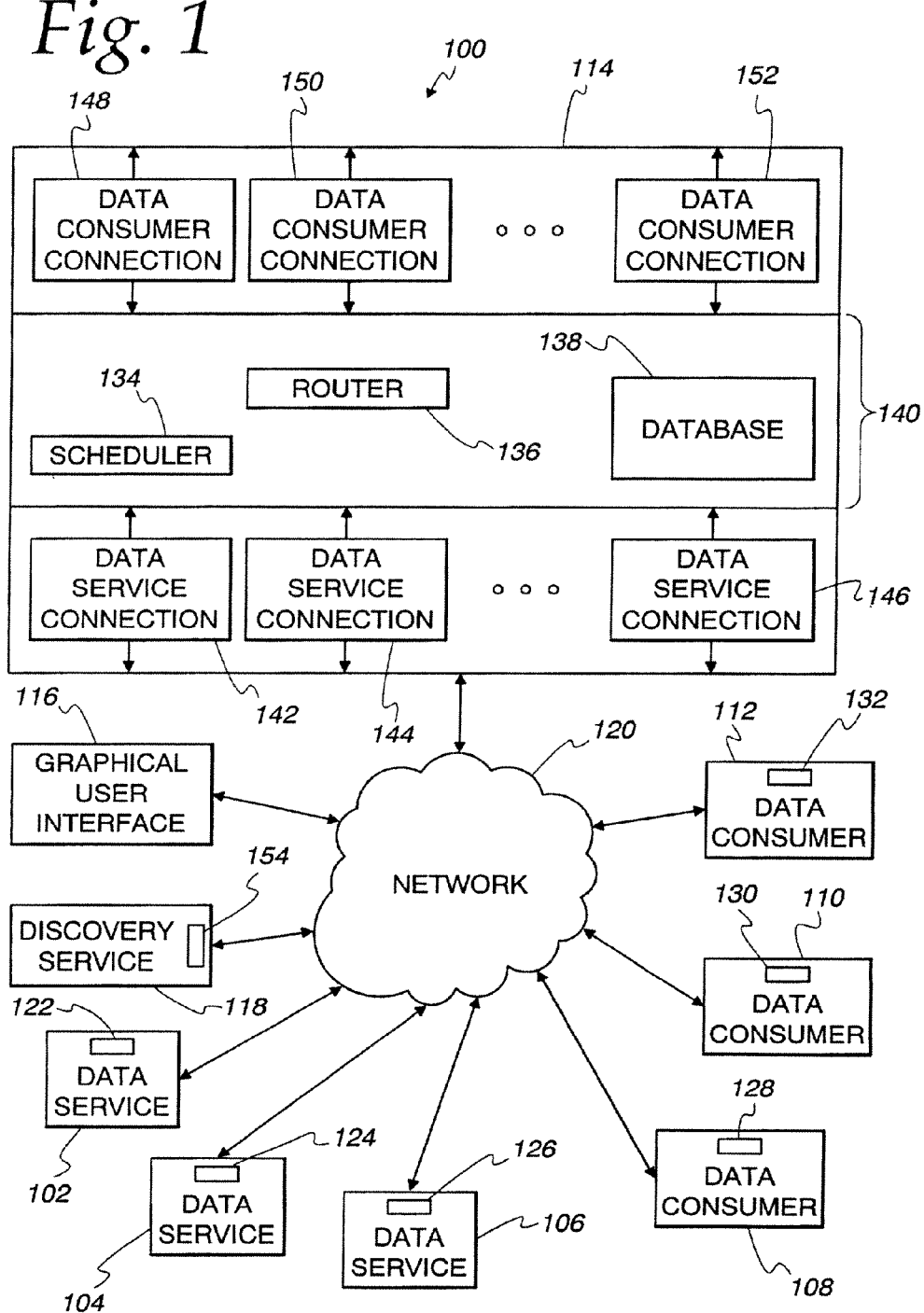
FIG. 1 is a functional block diagram of an example of a web services-based communication system.

The web services-based communication system and technique described herein may be used within a process control system or plant to facilitate the communication and viewing of information associated with the process control system or plant. More specifically, the web services-based communication system and technique described herein includes a communications engine that performs message routing, scheduling and configuration functions for a plurality of clients or web-services. Additionally, the web services-based communication system and technique described herein includes a graphical user interface that enables one or more users to configure and/or add web-services to the system and to create a highly personalized profile that causes the communications engine to route selected process control information and other information to be displayed to the user via the graphical user interface in a manner desired by the user. The web services, the communications engine and the graphical user interface may communicate with one another via a network such as, for example, the Internet using an extensible markup language (e.g., XML) or any other similar language that enables applications, services and/or systems to communicate with one another without requiring the development of custom communication interfaces or drivers.

Generally speaking, the web-services described herein may include data services or sources and data subscribers or consumers. For example, data services or sources may be process control systems or applications, asset management systems or applications, equipment condition monitoring systems or applications, diagnostic systems or applications, or any other system or application that acquires or generates information or data associated with the operation of a process control system or plant. On the other hand, data subscribers or consumers may include user-interactive applications such as, for example, campaign management systems or applications, computerized maintenance management systems or applications, and may also include communication systems or applications such as, for example, paging systems or applications, email systems or applications, file generations systems or applications, etc.

In any event, each of the data services and data consumers may be an application or system that includes a web services interface. As is well known, a web services interface may use an extensible markup language such as XML in conjunction with a messaging protocol such as, for example, simple object access protocol (SOAP) and a communications transport protocol such as, for example, hypertext transport protocol (HTTP). Because web services are somewhat generic in nature (i.e., the behavior or characteristics of the communications via a web server interface are independent of any underlying application or system), data services and data consumers can be easily connected to (i.e., communicate with) the communications engine without having to create any custom communication interfaces, as typically was the case with prior systems. Additionally, the communications engine may be easily adapted to discover or find (either automatically or at the direction of a used web services that are available for connection to the communications engine. For example, the communications engine may use a web services discovery tool or service such as, for example, universal discovery description and integration (UDDI), or any other type of web services discovery tool or service to identify available web services.

Still further, the web services-based communication system and technique described herein provides a system architecture that results in efficient and robust data collection, data analysis and data communication. In particular, the communications engine may request data from the data services as it is needed by the communications engine. Alternatively, one or more of the data services may be configured to asynchronously notify the communications engine as new data or information becomes available. In either case, efficient use of communications resources (e.g., communication links, processing capacity within the communications engine, etc.) may be achieved by the system and technique described herein. In particular, only newly available and/or data needed by the communications engine is conveyed between the various data services and the communications engine, as opposed to collecting all available data from the data sources regardless of whether the data was needed, as was the case with prior systems.

Further, with the web services-based communication system and technique described herein, the data services may perform complex analyses and may communicate analysis results (in addition to raw data, if desired) to the communications engine and, in turn, to the graphical user interface and/or other data consumers. Thus, because the web services-based communication system and technique described herein is adapted to transmit only requested and/or newly available data and, if desired, only analysis results (as opposed to all data required to perform the analysis at a central location such as the communications engine or the graphical user interface application), the web services-based communication system and technique described herein facilitates highly efficient use of available communication network bandwidth.

The web services-based communication system and technique described herein also provides a high degree of data robustness. In particular, each of the web services may be responsible for data backup, storage of data history, etc. As a result, a communications and/or power failure at the communications engine and/or the graphical user interface will not result in the catastrophic loss of data, and recovery of the system can be quickly and easily accomplished upon restoration of power and/or communications to the communications engine and/or the graphical user interface. Likewise, failure of a particular web service will not result in a catastrophic failure of the entire system, and when the failed web service recovers, the system can easily begin communicating with that web service without having to be reconfigured, restarted, etc.

Figure 4:
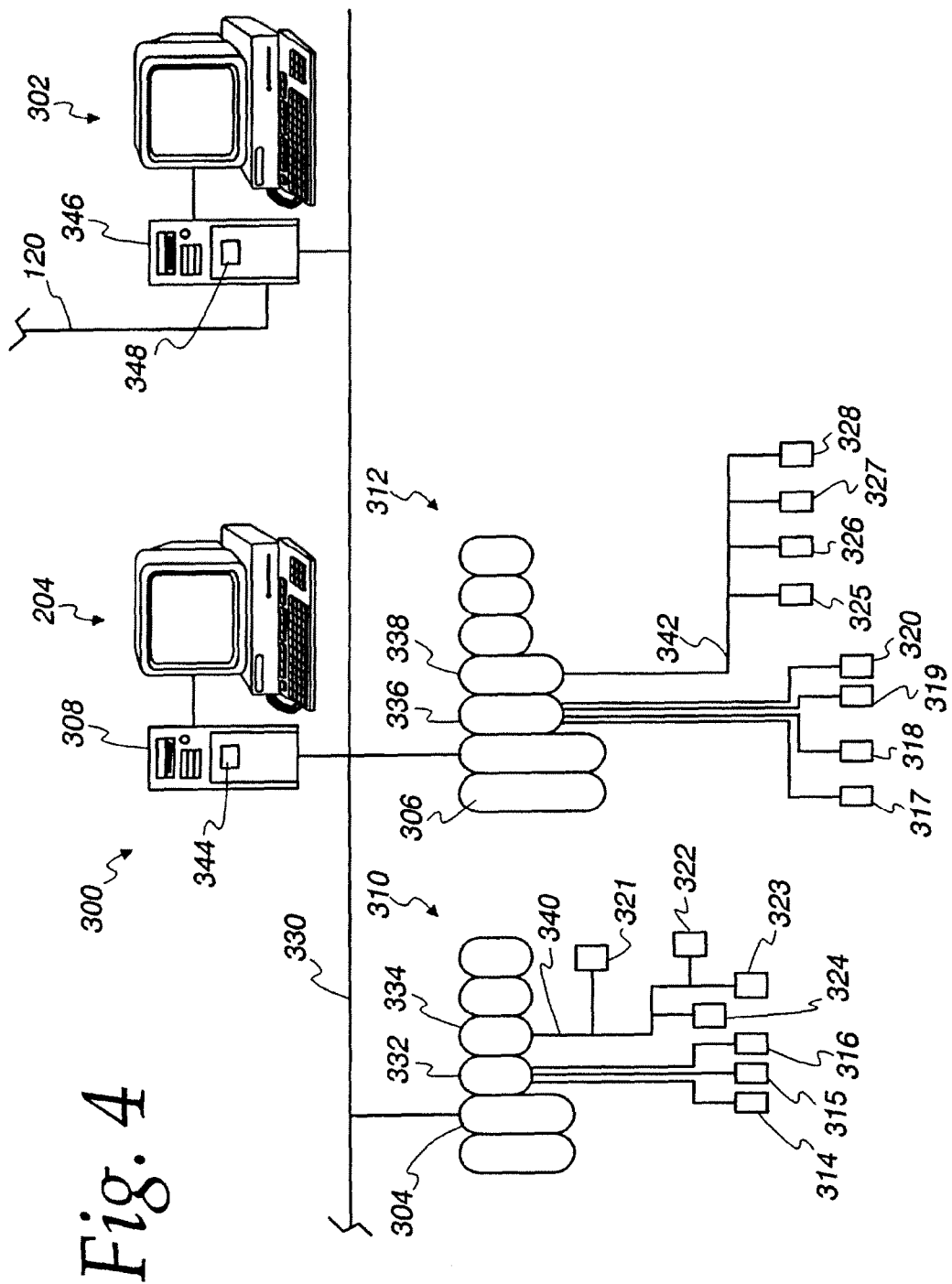
FIG. 4 is a schematic block diagram that illustrates one manner in which the advanced control and condition monitoring web service shown in FIGS. 2 and 3 may be implemented.

Now referring to FIG. 1, a functional block diagram generally depicts an example of a web services-based communication system 100 that may be used with a process control plant or system (e.g., FIG. 4). As shown in FIG. 1, the system 100 includes a plurality of data services 102-106, a plurality of data consumers 108-112, an information server 114, a graphical user interface 116 and a discovery service 118, all of which may be communicatively coupled to a network 120. In general, the data services 102-106 are systems or applications that perform data collection, generation and/or analysis activities. The data services 102-106 may be, for example, process management applications or other types of applications associated with a process control system or plant that are performed by one or more servers or other computers within the process control system or plant. Of course, the data services 102-106 may correspond to a single process control system or plant or may correspond to more than one process control system or plant. Additionally or alternatively, one or more of the data services 102-106 may, if desired, be associated with a system and/or application that is not a process control system or application.

Each of the data services 102-106 may include field devices, controllers, workstations, etc. that are communicatively coupled via one or more communication networks and/or other types of communication links. Each of the data services 102-106 may perform process control activities such as, for example, execution of control loops, may perform diagnostic activities, may perform asset management activities, etc. for a collection of equipment or devices associated with a particular process plant or portion of a process plant. Further, each of the data services 102-106 may also perform data historian functions, may include redundant or failsafe devices, may perform data analysis activities, all of which are generally well known in the art and, thus, are not described in greater detail herein.

Preferably, the data services 102-106 include respective web services communication interfaces 122-126, which enable the data services 102-106 to communicate within the system 100 as web services when connected to the network 120. The web services communication interfaces 122-126 may be implemented using XML messages that have been formatted using SOAP, or any other desired message protocol, and which have been encapsulated for transmission using a network transport protocol such as, for example, HTTP. Web services, generation of XML messages, SOAP and HTTP are all well known and, thus, are not described in greater detail herein.

In general, the data consumers 108-112 are systems or applications that perform activities or functions that consume process control data and/or which convey data or information provided by the data services 102-106 to system users or operators. One or more of the data consumers 108-112 may perform primarily communication functions that can route data or information to system users or operators using a particular communication media and platform. For example, data may be delivered by one or more of the data consumers 108-112 using hardwired or wireless media and using any desired system or hardware platform such as, for example, a laptop, a personal data assistant, email, etc. Alternatively, or additionally, one or more of the data consumers 108-112 may perform primarily user-interactive activities such as, for example, batch definition and campaign management activities and/or may perform other primarily business-related activities such as, for example, order processing activities, accounting activities, product shipping and administration activities, product inventory control activities, quality assurance activities, procurement activities, etc. As with the data services 102-106, the data consumers 108-112 also include respective web services communication interfaces 128-132, which enable the data consumers 108-112 to communicate as web services within the system 100.

As shown in FIG. 1, the information server 114 includes a scheduler 134, a router 136 and a database 138, which collectively function as a communications engine 140 that performs message routing and scheduling activities as well as system configuration activities, as described in greater detail below. The communications engine 140 may establish a plurality of data service connections 142-146, each of which corresponds to one of the data services 102-106, and may similarly establish a plurality of data consumer connections 148-152 that correspond to the data consumers 108-112. As described in greater detail below, the communications engine 140 may dynamically establish the connections 142-152 as they are needed to communicate with the data services 102-106 and the data consumers 108-112 via their respective web services interfaces 122-126 and 128-132.

In general, the router 136 performs message routing functions that receive messages from one or more of the web services, which includes the data services 102-106 and the data consumers 108-112, coupled to the network 120 via the connections 142-152 and route these received messages to appropriate destinations, which may be any of the web services (e.g., the data services 102-106 and data consumers 108-112) coupled to the network 120. More specifically, the router 136 may function in a manner similar or identical to an XML transaction server. In particular, the router 136 may use input and output schemas in conjunction with business rules, data manipulations, etc., all of which may be stored in and retrieved from the database 138, or which may be provided by another one of the web services coupled to the network 120, to route XML messages received from one or more of the web services coupled to the network 120 to another one or ones of the web services.

By way of example, the data service 102 may generate alarm or alert information that needs to be conveyed to the data consumer 112, which may be a communication system or application such as an email system or application. When the alert or alarm information is generated, the data service 102 uses its web services interface 122 to wrap the alert or alarm information in an XML schema to form an XML message, encapsulates the XML message using HTTP and sends the XML message to the network 120. The network 120 uses the HTTP encapsulation to route the XML message, using known techniques, to an appropriate one of the data service connections 142-146 available within the information server 114. The communications engine 140 receives the XML message from the one of the data service connections 142-146 that received the XML message and the router 136 uses an appropriate input schema (retrieved from the database 138) to decode the XML message. The router 136 may then, based on the content of the decoded message and one or more rules and/or data manipulations, map the contents (or a portion of the contents) of the message to an appropriate output schema associated with the destination (i.e., the data consumer 112), which may also be retrieved from the database 138. The router 136 may then encapsulate the mapped alarm or alert message (which is also an XML message) using HTTP and may send the encapsulated message to the data consumer 112 via the one of the data consumer connections 148-152 associated with the data consumer 112 and the network 120 to the data consumer 112. The data consumer 112 then receives the alert or alarm information via its web services interface 132 and may generate an email message that conveys the alert or alarm information to one or more designated users.

Thus, the router 136 is adapted to process messages, which are preferably, but not necessarily, expressed using XML or some other extensible markup language, received from a plurality of web services such as, for example, data services, via a communication network and routes or sends these messages to other web services that are also coupled to the communication network. Because all of the data generation and data consuming applications or systems that make up the system 100 are configured to communicate as web services, the information server 114 and, more particularly, the communications engine 140, can dynamically establish communications with any of the data generation or consuming applications or systems by adding or removing connections (e.g., the connections 142-152) without having to generate any custom communication interfaces or drivers and without having to halt the operations of the communications engine 140 (i.e., connections to applications can be established without disturbing communications between already connected web services and the communications engine 140). To the contrary, because each of the data services 102-106 and each of the data consumers 108-112 includes a web services interface and because the communications engine 140 is adapted to communicate with web services, it is not necessary for the information server 114 or for any of the web services coupled to the network 120 to have any detailed knowledge about the operation of the systems or applications being performed by any of the other web services to enable information to be exchanged between the web services via the information server 114.

In general, the scheduler 134 performs scheduling functions that enable the communications engine 140 to periodically request information from one or more of the data services 102-106. More specifically, the scheduler 134 may establish periodic requests for information or data from one or more of the data services 102-106, particularly where the information requested is of a type that would not generate an event. For example, if one of the data consumers 108-112 periodically needs information or data such as a control loop value, which would not normally cause an alarm or alert, from one of the data services 102-106, the scheduler 136 may be configured to periodically send messages requesting the control loop value or data to the one or ones the data services 102-106. The one or ones of the data services 102-106 receiving the request may subsequently send the data to the information server 114 in the form of an HTTP encapsulated XML message, which may then be routed by the router 136 to the appropriate ones of the data consumers 108-112 via the network 120.

The discovery service 118 may also include a web services interface 154 that enables the discovery service 118 to communicate with the information server 114, the data services 102-106 and/or the data consumers 108-112, as desired. The discovery service 118 may be a web services directory or registry service such as, for example, UDDI or any other similar or different web services directory or registry. As is well known, UDDI enables a web service to discover and obtain interface and/or communications information about another web service, which may then be used by the discovering web service or server to automatically establish communications with the discovered web service.

The system 100 may use the discovery service 118 to automatically or dynamically establish communications between the information server 114, the data services 102-106 and the data consumers 108-112, without requiring intervention from a system user or operator, a programmer, etc. By way of example only, at initial start up or power up of the system 100, the information server 114 and, in particular the communications engine 140, may communicate with the discovery service 118 to determine what web services are coupled to the network 120 and available for use by the system 100. The communications engine 140 may store available web services and communications interface information pertaining to available web services in the database 138. The information related to available web services may then be automatically and periodically updated by the communications engine 140 so that if a web service becomes unavailable, becomes available, and/or if communications interface information relating to any available web service changes, such information may be reflected in the database 138 for use by the communications engine 140 in routing and scheduling communications.

Each of the web services that is discovered, licensed (if required) and coupled to the information server via the network 120, may have a unique service identifier (SID) associated therewith. In this manner, the communications engine 140 may store communications interface information and other information pertaining to each of the available web services in a table or any other data structure within the database 138. The table or other data structure may subsequently be used by the router 136 and the scheduler 134 to route messages received from particular services and to schedule information requests from particular services.

The graphical user interface 116, the operation of which is discussed in greater detail in connection with FIGS. 5-20 below, performs functions that enable a system user or operator to selectively view information provided by the data services 102-106 and/or data consumers 108-112, to configure communications (e.g., to schedule information requests, establish routings, etc.) within the system 100 and/or to generally interact with applications or services that are communicatively coupled to the network 120 via the information server 114. The type of information presented by the graphical user interface 116 and the manner in which information may be presented by the graphical user interface 116, may vary from user to user based on profiles that are defined by the users and stored in the database 138. By way of example, a user may initially interact with the system 100 via the graphical user interface 116 to define a profile and the information or content that the user wants displayed. A particular user's profile may include information associated with the user's organizational role (e.g., manager, engineer, executive, etc.), the hours that the user works (e.g., the user's shift), the personal preferences of the user, the manners and times in which the user may be contacted off-site or on-site, etc. The user profile information may be sent by the graphical user interface 116 to the information server 114, which may store the user profile information in the database 138.

In addition to user profile information, configuration information associated with each user may also be stored in the database 138. A user may interact with the graphical user interface 116 to establish the manner in which the user wants to view information from the data services 102-106 and the data consumers 108-112, the manner in which the user wants information to be conveyed between the various web services coupled to the network 120, etc. To store configuration information for each user, a table may be generated in the database 138 so that each user is assigned a unique identifier or a user ID (UID) and a user's desired configuration for each of the available web services is stored along with the UID and the SIDs of the services.

By way of example, when a user logs into the graphical user interface 116, they may be authenticated using their username and password. In turn, the username and password information may be used to create or may be associated with a security identifier (e.g., the UID). The graphical user interface 116 may send the UID for that user to the information server 114, which will then retrieve the profile and configuration information associated with that UID from the database 138. The profile and configuration information may then be used by the communications engine 140 to establish the manner in which messages will be routed, the manner in which the scheduler 134 requests information from the data services 102-106, the type and manner in which information will be displayed by the graphical user interface 116, etc. while that user (or at least that user's UID) remains in control of the graphical user interface 116.

While the graphical user interface 116 (and the software application or applications associated therewith) is depicted in FIG. 1 as being performed within a separate system, server, workstation or computer, the graphical user interface 116 may instead be instantiated within the information server 114 or any other server or computer system coupled the network 120, if desired. Of course, additional graphical user interfaces similar or identical to the graphical user interface 116 may be coupled to the network 120, thereby enabling multiple users to interact with the system 100 at the same time or at different times. Furthermore, it should be recognized that while the exemplary system shown in FIG. 1 depicts the network 120 as a single network such as, for example, the Internet, that links all of the components of the system 100, a variety of other network structures may be used instead. For example, some or all of the data services 102-106 may be communicatively coupled to the information sever 114 via an Ethernet network, while some or all of the data consumers 108-112 may be communicatively coupled to the information server 114 via another separate network, which may be based on Ethernet or some other protocol or standard. Of course, the web services and other components (e.g., the graphical user interface 116) communicating with the information server 114 may communicate using any desired combination of network types (e.g., Ethernet, Internet, etc.) using any combination of hard-wired and wireless communication media.

Figure 2:
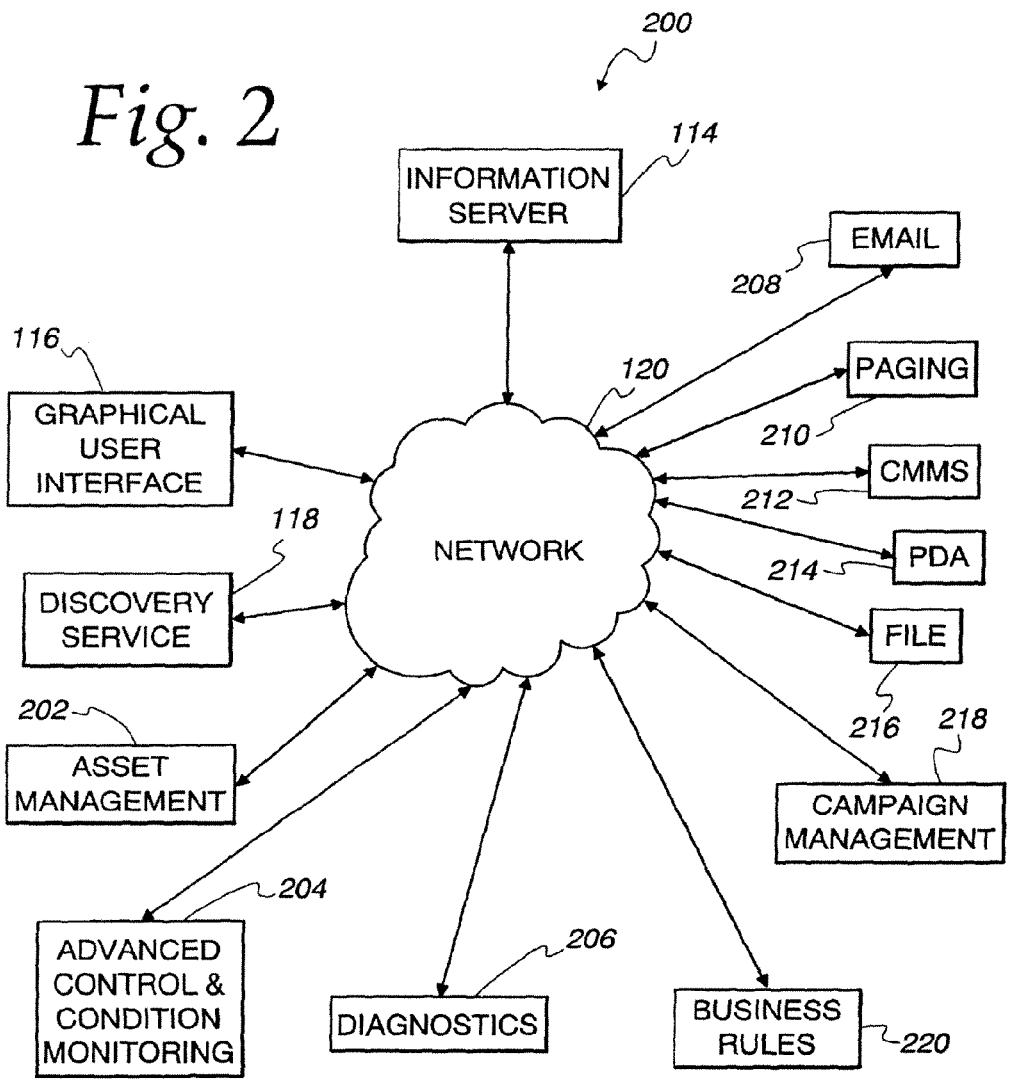
FIG. 2 is a block diagram that illustrates one manner in which the web services-based communication system shown in FIG. 1 may be adapted for use with a process control system or plant.

FIG. 2 is an exemplary block diagram of one manner in which the web services-based communication system 100 shown in FIG. 1 may be adapted for use with a process control plant or system. The exemplary system 200 shown in FIG. 2 includes the information server 114, the graphical user interface 116, the discovery service 118 and the network 120 that are shown in FIG. 1. However, the system 200 includes types of web services that would typically be associated with a process control plant or system. As shown in FIG. 2, the system 200 may include an asset management web service 202, an advanced control and condition monitoring web service 204 and a diagnostics web service 206. Each of the web services 202-206 may correspond generally to the data services 102-106 shown in FIG. 1. Additionally, each of the services 202-206 may include an application or applications that are executed by different servers, workstations or other computer systems within a particular process control plant or system. For example, the asset management web service 202 may include a server that is performing one or more asset management software applications for a particular process control plant. These asset management applications may perform process optimization activities that seek to maximize plant profitability based on a wide range of information, including, for example, process control parameters, maintenance information, business information, etc. The advanced control and condition monitoring web service 204 may perform alarm or alert functions, process condition monitoring functions such as, for example, loop monitoring functions, real-time optimization functions, expert system functions, etc. and equipment condition monitoring functions such as, for example, vibration monitoring functions, predictive maintenance functions, etc. The diagnostics web service 206 may include applications that perform plant diagnostic functions such as, for example, providing information associated with clogged or clogging impulse lines, information associated with an intermittent communication failure, etc. In any event, the web services 202-206 may be characterized as data services because they include applications that acquire data and/or perform data analysis activities that generate analysis or results data.

The system 200 shown in FIG. 2 also includes a plurality of web services that may be characterized as data consumers. For example, the system 200 includes an email web service 208, a paging web service 210, a computerized maintenance management system (CMMS) web service 212, a personal data assistant web service 214, a file system web service 216, a campaign management web service 218 and a business rules web service 220. The email web service 208 may be adapted to generate email messages based on messages received from one or more data services such as, for example, the asset management web service 202, the advanced control and condition monitoring web service 204 and the diagnostics web service 208. The email web service 208 may send these email messages to, for example, to one or more user interfaces, which may identical or similar to the graphical user interface 116, and/or to some other computer system accessible by users. In a similar manner, the paging web service 210 may receive messages containing, for example, alarm or alert information from another web service within the system 200 via the information server 114 and the network 120 and may convey information relating to the alarm or alert to one or more pagers associated with one or more users (e.g., maintenance personnel, technicians, etc.) or other persons associated with the system 200.

The personal data assistant web service 214 may receive messages containing information from data sources such as the web services 202-206 and may convey information contained in these messages to one or more personal data assistant computers, each of which may be carried or operated by a different person or user. In this manner, a system user may, if desired, configure the system 200 to send selected detailed information about the operation of a process control plant or system including, for example, diagnostic information, advanced control and condition monitoring information, asset management information, or any other information to their personal data assistant computer.

The file system web service 216 may receive messages containing process control data, diagnostic data etc. from one or more of the web services 202-206 via the information server 114 and the network 120 and may store the information contained therein in one or more data files, which may subsequently be accessed, transmitted, printed, displayed, etc.

The CMMS web service 212, the campaign management web service 218 and the business rules web service 220 may be characterized as user-interactive applications or services. The CMMS web service 212 may, for example, enables users to configure the type of and the manner in which alert or alarm information should be conveyed to them. Additionally, the CMMS web service 212 may perform functions that generate work orders (either in electronic or paper form) that may be printed or displayed at a central location such as, for example, a maintenance department within a process plant, that may be conveyed directly to the persons responsible for responding to the work orders, etc. Still further, the CMMS web service 212 may generate orders for replacement parts that may be needed to repair or otherwise maintain a process control plant associated with the system 200. The part orders generated by the CMMS web service 212 may, in turn, be sent in the form of HTTP encapsulated XML messages to a business system such as, for example, a procurement system (not shown) that is communicatively coupled to the network 120.

The campaign management web service 218 may include any desired campaign management application or applications that are used to define and manage the execution of one or more batch processes within a process control plant. The business rules web service 220 may include one or more applications that function to change the operating parameters of a process control plant or system based on data received from process control applications and/or business applications. Both campaign management applications and business rules applications are well known and, thus, are not described in greater detail herein.

It is important to recognize that data or information typically flows from web services such as the asset management web service 202, the advanced control and condition monitoring web service 204 and the diagnostics web service 206, all of which typically acquire data, analyze data and generate analysis results data, to primarily data consuming web services such as, for example, the email web service 208, the paging web service 210, the CMMS web service 212, the personal data assistant web service 214, the file system web service 216, the campaign management web service 218 and the business rules web service 220. However, any one of the web services 202-220, the discovery service 118 and the graphical user interface 116 may send messages or exchange information with one or more of the other web services 202-220, the discovery service 118 and the graphical user interface 116 via the network 120 and the information server 114.

In operation, the system 200 may initially not have knowledge of any of the web services 202-220, may not have any user configurations or profiles stored within the information server 114 and, thus, may not initially route any messages from any of the data sources (i.e., the web services 202-206) to any of the data consumers (i.e., the web services 208-220). The information server 114 may then use the discovery service 118 to discover each of the available web services 202-220, which are coupled to the network 120. In particular, the information server 114 may retrieve communications interface information (e.g., schema information, network address information, etc.) from the discovery service 118 and may store this information within its database 138 (FIG. 1) together with the SIDs that uniquely identify each of the discovered web services. Once the information server 114 has obtained the communications interface information and other configuration information associated with the discovered web services, the router 136 (FIG. 1) may then enable the exchange of messages between the web services 202-220 and the graphical user interface 116.

As described in greater detail in connection with FIGS. 5-20 below, users may interact with the graphical user interface 116 to create user profiles and configurations, which are stored within the database 138 together with a UID for each user. The user profiles and configurations may be used by the graphical user interface 116 to control the type and manner in which data will be displayed to each user and may be used by the information server 114 to control the manner in which messages are routed between the web services 202-220. In this manner, when a particular user enters their authentication information (e.g., username and password) into the graphical user interface 116, the information server 114 retrieves the unique security identifier (i.e., the UID) associated with that user. The information server 114 may then use the UID to retrieve the configuration information associated with that user's UID from the database 138 and configures the router 136 and the scheduler 134 to operate so that messages are automatically conveyed to the graphical user interface 116 in the manner specified by that user's configuration and/or profile. In the case where the graphical user interface 116 is implemented using an Internet browser application, the messages conveyed by the information server 114 to the graphical user interface 116 are preferably based on hypertext markup language (HTML), rather than XML, so that a conventional browser application may be used to display information to the user in the desired format. As different users log into the graphical user interface 116, the information server 114 automatically routes messages in a manner that will supply the information to the graphical user interface 116 as specified by that user's configuration. Thus, as each user uses the graphical user interface 116, the format and content of the information displayed will automatically be varied to suit that user's configuration and/or profile.

Of course, the graphical user interface 116 may include one or more security measures that prevent unauthorized users from obtaining detailed information about the system 200 from the information server 114 and from entering or modifying the configurations and/or profiles within the system 200. The system 200 may use one of more of these security measures to determine whether or not a person attempting to access the system 200 should be allowed access and, if access is granted, the extent of that access. In other words, some users may be granted more or greater access privileges than other users so that while one user may be able to view and/or modify any configuration and/or profile information associated with the system 200, another user or users may only be permitted to view selected information and may not be permitted to modify any configuration or profile information.

While the content and format of the information displayed within the graphical user interface 116 may vary as different users log into or use the graphical user interface 116, the various message routing configurations associated with the data consuming web services (e.g., the web services 208-220) remain active for each of the user profiles stored within the database 138 (FIG. 1). Thus, users that are not logged into the graphical user interface 116 (or any other interface within the system 100) may nevertheless continue to receive messages via the email web service 208, the paging web service 210, or any other web service specified by their stored profile. For example, an alert or alarm may be generated by a process control system associated with the advanced control and condition monitoring web service 204, which may convert the alarm or alert into an XML message, encapsulate the XML using HTTP and send the message via the network 120 to the information server 114. The information server 114 may then process the received alarm or alert message and may thereby determine, using the user profiles and schemas stored within the database 138, to whom and in what manner the alert or alarm message should be conveyed. The information server 114 will then cause the router 136 (FIG. 1) to send the alert or alarm message to one or more users using or more of the data consuming web services (e.g., the web services 208-220). In particular, the router 136 may send the alert or alarm message to one user via the email web service 208 and the paging web service 210 (based on that user's profile), may send the alert or alarm message to another user via the paging web service 210 and the personal data assistant web service 214, and may also send the alert or alarm message to the graphical user interface 116 to be displayed to a user that has entered a configuration that requires the display of such alarms or alerts when that user is logged into the graphical user interface 116 or any other similar or identical user interface within the system 100.

Figure 3:
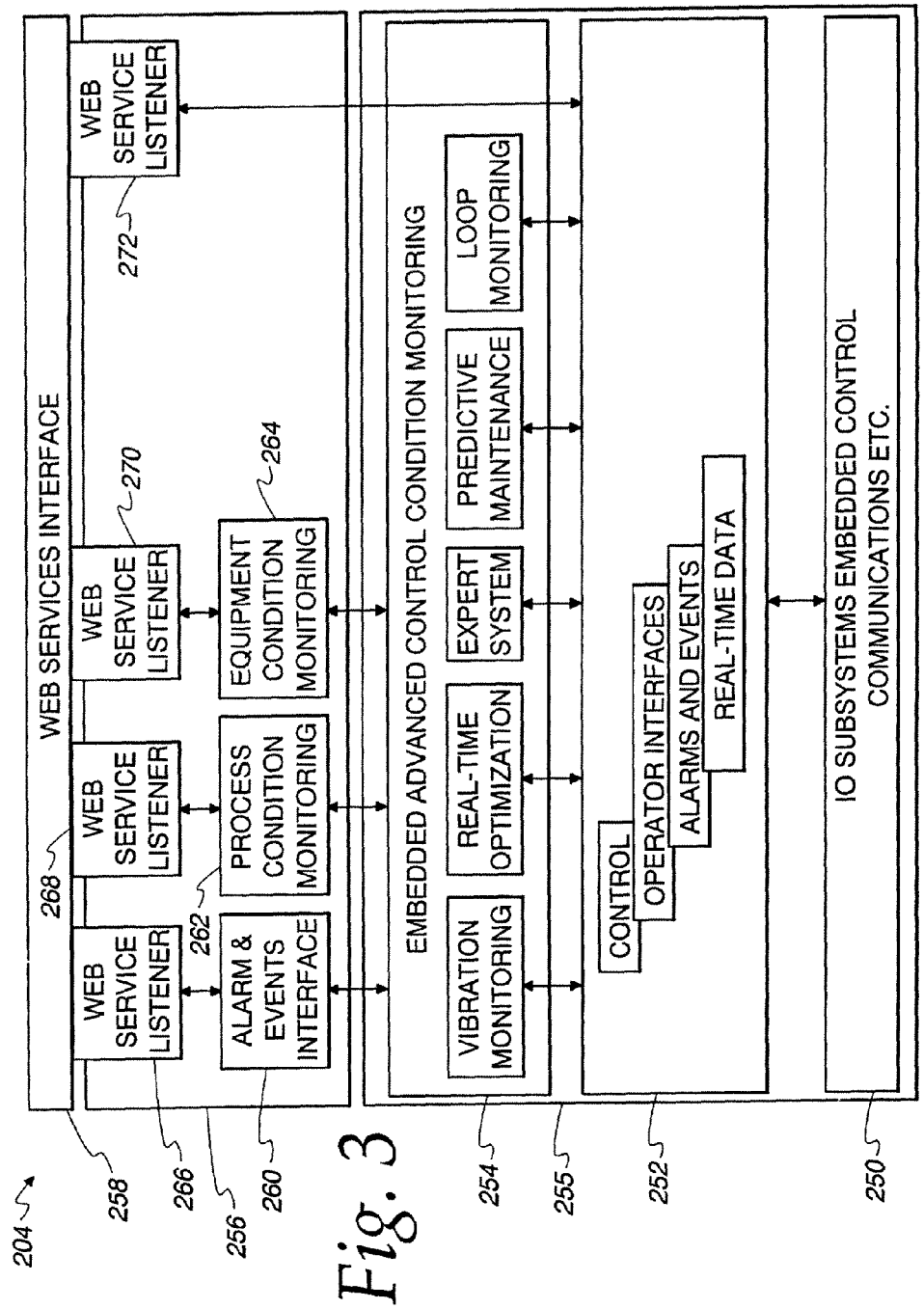
FIG. 3 is a more detailed functional block diagram of the advanced control and condition monitoring web service shown in FIG. 2.

FIG. 3 is a more detailed functional block diagram of the advanced control and condition monitoring web service 204 shown in FIG. 2. As shown in FIG. 3, the advanced control and condition monitoring web service 204 includes an input/output (I/O) subsystems block 250, a process control subsystems block 252 and an embedded advanced control and conditioning monitoring block 254, all of which collectively form a process control system 255. Additionally, the advanced control and condition monitoring web service 204 includes a web services block 256 and a web services interface 258, both of which function to enable the process control system 255 to exchange information or messages with other web services via the network 120 (FIGS. 1 and 2) and the information server 114 (FIGS. 1 and 2). The I/O subsystems block 250 includes controllers, I/O devices and field devices connected thereto, which are discussed in greater detail below in connection with FIG. 4. The process control subsystems block 252 is preferably, but not necessarily, implemented using one or more software routines or applications that may be executed within one or more of workstations of other computer systems. By way of example, the process control subsystems block 252 may include software routines or applications that carry out control functions, operator interface functions, alarms and events processing functions, real-time data processing functions, or any other desired functions.

The embedded advanced control and condition monitoring block 254 may be implemented using a plurality of software routines or applications that process data and other information associated with the operation, condition, etc. of a process control system such as, for example the process control system 300 shown in FIG. 4. For example, the embedded advanced control and condition monitoring block 254 may include vibration monitoring routines or applications, real-time optimization routines or applications, expert system routines or applications, predictive maintenance routines or applications, loop monitoring routines or applications, or any other desired data analysis or data processing routines or applications. One or more of the routines or applications executed by the embedded advanced control and condition monitoring block 254 may be performed within the same computer system or workstation that is being used to execute routines or application associated with the process control system subsystems block 252 or, alternatively, one or more of the routines or applications associated with the embedded advanced control and condition monitoring block 254 may be performed within any other workstation or computer system that is communicatively coupled to the process control subsystems block 252.

The web services block 256 may include an alarms and events interface block 260, a process condition monitoring block 262 and an equipment condition monitoring block 264, all of which may be communicatively coupled to respective web service listeners 266, 268 and 270. Additionally, the web services block 256 may also include a web service listener block 272 that is communicatively coupled directly to the process control subsystems block 252 as shown in FIG. 3. Generally speaking, the web services block 256 enables information or physical data associated with alarms or events, process conditions and equipment conditions within a process control system to be conveyed to and from the information server 114 (FIGS. 1 and 2). More specifically, the web services block 256 provides a portion of a web services framework or architecture that facilitates intra-system communications because conventional and commonly used transport protocols, such as, for example, HTTP and data language and format protocols, such as, for example, XML and SOAP, may be used convey process control information to the information server 114.

As described in more detail below, the web service listeners 266-272 receive incoming messages that contain requests for service, parse these incoming messages and dispatch the requests for service to appropriate methods available within the web services block 256. Preferably, but not necessarily, the web service listeners 266-272 receive service requests and also provide service responses. Still further, the listeners 266-272 may provide contracts and other documents associated with the web service or services in communicating with that listener. Additionally, the web service listeners 266-272 preferably, but do not necessarily, convey alarm and event data, process condition data and equipment condition data using XML.

The web services interface 258 manages communications between the various web services within the web services block 256 and the information server 114, which may communicate with a process control system via the web services interface block 258 as a web client. In general, the web services interface block 258 provides a hosting or web server environment (i.e., a common interface) that enables a plurality of relatively technically diverse information systems such as, for example, manufacturing execution systems, enterprise resource planning systems, etc., or any other system associated with a remotely situated process control plant, customer, supplier, etc., to send and receive process control information or data to the process control subsystems block 252 and the advanced embedded control and condition monitoring block 250. In particular, the web services interface 258 is adapted to listen for incoming HTTP requests, perform security checks involving user authentication/verification, look up connection information and dispatch authorized HTTP requests to establish a connection with an appropriate one of the web service listeners 266-272 available within the web services block 256, facilitate automatic recovery from service, hosting environment and system failures, provide administrative facilities for deploying, monitoring and controlling services and managing resources such as, for example, processes, threads and shared state on behalf of each service.

In response to HTTP-based requests, the web services interface 258 may authenticate the requesting entity (e.g., another other web service) as a proper client of the web services block 256. Client authentication may be based on an identity of a user (i.e., based on the UID and/or some other identifier), the identity of the requesting entity itself, a terminal location or any other suitable identification technique. If the requesting entity is authenticated as a proper client, the web services interface 258 establishes a connection with an appropriate one of the web service listeners 266-272 within the web services block 256. For example, in the case that the requesting entity is interested in device alarm or alert information, the web services interface 258 may establish a connection with a web service associated with the web service listener 266 and the alarms and events interface block 260. Once such a connection is established, any type of process control information accessible by the web service may be communicated between the requesting client and the process control system using HTTP packets containing XML formatted data.

When a device within the I/O subsystems block 250 generates a device alert or alarm such as, for example, a maintenance alert, the I/O subsystems block 250 sends this maintenance alert to the web services block 256 via the alarms and events interface 260. In turn, the web service associated with the web service listener 266 and the alarms and events interface 260 converts the received maintenance alert into an XML format and then sends the XML formatted alert information or data to the information server 114 via the network 120. Of course, as described above, appropriate input and output schemas need to be in place to properly convey the device alert information from the information server 114 to the appropriate data consuming applications or web services.

It should be recognized that the web services framework or architecture provided by the web services interface 258 and the web services block 256 enables any authenticated client to exchange information or data with the I/O subsystems block 250 and the process control subsystems block 252 using XML-based communications encapsulated within HTTP packets. Thus, any device that can execute an internet browser application can communicate with the advanced control and condition monitoring web service 204 via the web services interface 258 and the web services block 256. For example, a remote terminal or a hand held computer device adapted to execute a browser application may communicate with the advanced control and condition monitoring web service 204 via the Internet or any other conventional or suitable communication link.

FIG. 4 is a schematic block diagram that depicts, by way of example, one manner in which the advanced control and condition monitoring web service 204 may be implemented. As shown in FIG. 4, the advanced control and condition monitoring web service 204 generally includes a process control system portion 300 and a web services portion 302, which respectively correspond to the process control system block 255 and the web services block 256 shown in FIG. 3. The process control system 300 includes controllers 304 and 306 connected to a host workstation or computer 308, which may be any type of personal computer or workstation and banks of input/output (I/O) devices 310 and 312, each of which is connected to one or more field devices 314-328. The controllers 304 and 306 may be, for example, DeltaV™ controllers sold by Fisher-Rosemount Systems, Inc., and are communicatively connected to the host computer 308 via, for example, an Ethernet connection 330 or any other suitable communication link. Likewise, the controllers 304 and 306 are communicatively connected to the field devices 314-328 using any desired hardware and software associated with, for example, standard 4-20 mA devices and/or any smart communication protocol such as the Fieldbus or HART protocols.

As is generally known, the controllers 304 and 306 may implement or supervise process control routines stored therein or otherwise associated therewith and communicate with the field devices 314-328 to control a process being executed by the process control system 300 in any desired manner. The field devices 314-328 may be any types of devices, such as sensors, valves, transmitters, positioners, etc., while I/O cards 332-338 within the banks 310 and 312 may be any types of I/O devices conforming to any desired communication or controller protocol such as HART, Fieldbus, Profibus, etc. In the exemplary process control system 300 shown in FIG. 4, the field devices 314-316 are standard 4-20 mA devices that communicate over analog lines to the I/O card 332, the field devices 317-320 are HART devices connected to the HART compatible I/O card 336, and the field devices 321-328 are smart devices, such as Fieldbus field devices, that communicate over digital busses 340 and 342 to the I/O cards 334 and 338 using, for example, Fieldbus protocol communications. Of course, the field devices 314-328 and the banks of I/O cards 310 and 312 may conform to any other desired standards or protocols instead of the 4-20 mA, HART or Fieldbus protocols, including any standards or protocols developed in the future.

The workstation or computer 308 also includes software 344 that, when executed by the workstation 308, performs process control functions such as, for example, real-time data gathering and analysis, alarm and event processing, operator interface functions, control functions, etc. In addition, the software 344 may also perform advanced control and condition monitoring functions such as, for example, vibration monitoring, real-time optimization, expert system analysis, predictive maintenance, loop monitoring, etc. Thus, the banks of I/O devices 310 and 312, including the controllers 304 and 306 and the field devices 314-328 connected thereto, generally correspond to the I/O subsystems block 250 shown in FIG. 3. The workstation or computer 308 and the software 344 therein, generally correspond to the process control subsystem and embedded advanced control and condition monitoring blocks 252 and 254 shown in FIG. 3. Although FIG. 4 depicts the functions of the process control subsystem block 252 and the embedded advanced control and condition monitoring block 254 as being performed by the software 344 within a single workstation (i.e., the workstation 308), if desired, the various functions performed by the blocks 252 and 254 may be performed by two or more workstations or computers coupled to the network 330.

As shown in FIG. 4, the web services portion 302 includes a computer or workstation 346 having software 348 stored therein. The workstation 346 is communicatively coupled to the network 330 and to the network 120 (FIGS. 1 and 2). The software 348, when executed by the workstation 346, performs the functions of the web services and web services interface blocks 256 and 258 shown in FIG. 3. However, it should be recognize that the software 348 could, instead, be stored and executed within the workstation 308, thereby eliminating the need for multiple workstations, if desired.

Before describing the functions of the graphical user interface 116 (FIGS. 1 and 2) in more detail, it is important to note that the graphical user interface 116 may be implemented by executing an internet browser application within a workstation or computer that is coupled to the network 120. The information server 114 may then convey HTML formatted pages or files that can be readily displayed by the browser software being executed by the graphical user interface 116. As discussed in greater detail in connection with FIGS. 5-20 below, the HTML pages displayed by the graphical user interface 116 may contain process control information, analysis results, configuration information particular to the current user, general information, etc. Although the graphical user interface 116 is described herein as being implemented using internet browser software and the information server 114 is described as being adapted to produce HTML formatted information for use by the graphical user interface 116, the graphical user interface 116 could instead be implemented using non-browser software (i.e., a specially developed graphical user interface software) designed to receive messages from the information server 114 using XML or any other data type and format.

Figure 5:
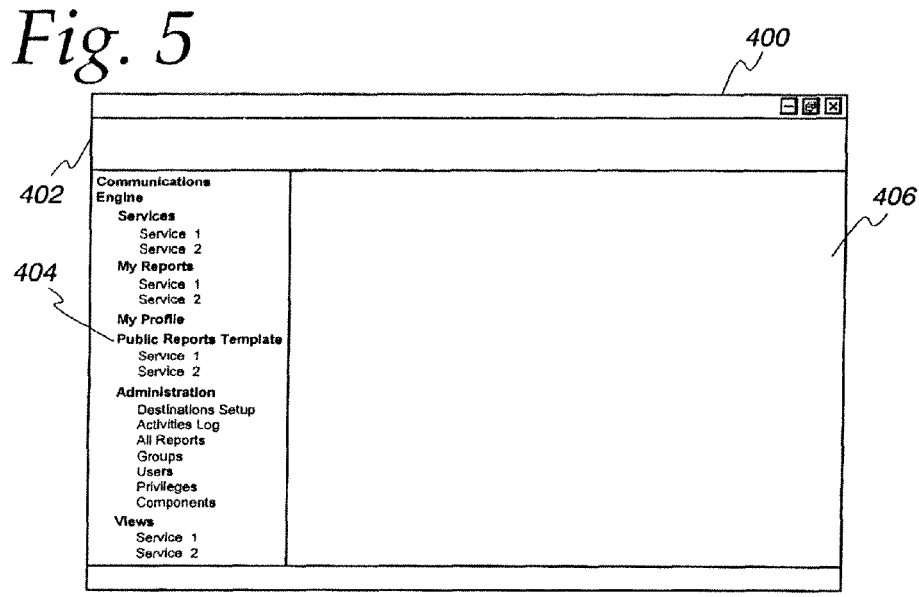

FIG. 5 depicts an example of a display window 400 that may be displayed by the graphical user interface 116 (FIGS. 1 and 2) when being used by an authorized user. The window 400 includes a banner area 402, a tree selection guide 404 and an active display area 406. The banner area 402 may include textual and/or other graphical information relating to the software being executed by the graphical user interface 116, a personal greeting for the user, general messages or other information relating to the system to which the graphical user interface 116 is currently communicating with, general news or other information such as, for example, the weather, the date and time of day, etc.

The tree selection guide 404 includes a hierarchical arrangement of the various features, services and/or functions that can be performed by the graphical user interface 116, the information server 114 and generally any of the available web services with which the information server 114 can communicate. The active display area 406 displays information pertaining to the feature or function of the graphical user interface 116 that is currently selected (e.g., highlighted and selected using a mouse or keyboard, for example) by the user via the tree selection guide 404. The window 400 may be generated by an internet browser application being executed by the graphical user interface 116, and the content within the window 400 (e.g., the display area 406, the tree 404, etc.) may be generated by the information server 114 and transmitted to the browser application being executed by the graphical user interface 116 as HTML messages via the network 120.

Figure 6:
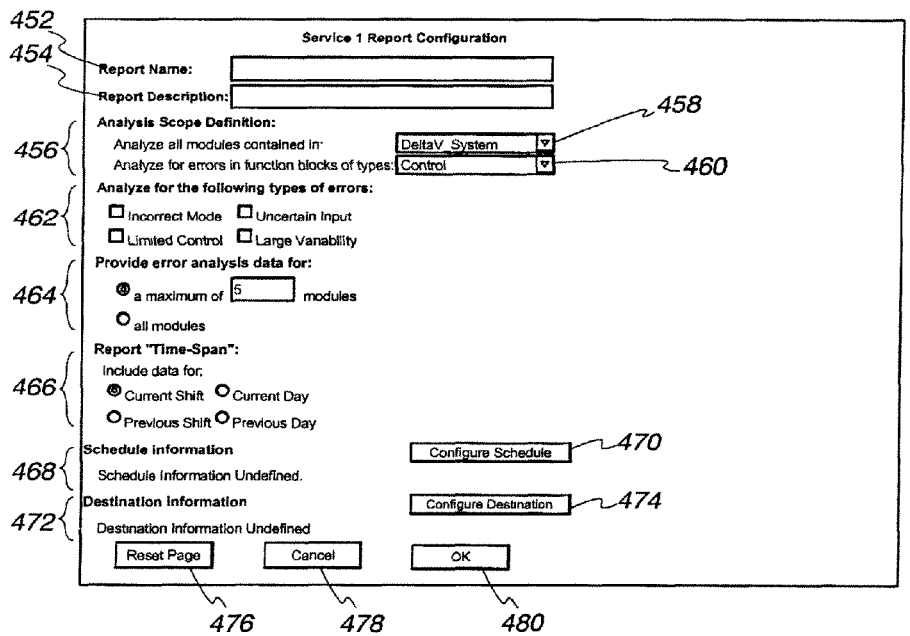

FIG. 6 depicts an example of a view 450 that may be displayed within the active display area 406 in response to a user selecting a particular service for configuration. In the example shown in FIG. 6, the user has selected "service 1" for configuration. Service 1, in this example, is an application or service that analyzes or inspects the performance of control loops or modules and returns selected results to the user. Service 1 could be performed, for example, by the advanced control and condition monitoring web service 204 shown in FIGS. 2 and 3. In any case, as depicted in the exemplary view 450, a report name field 452 and a report description field 454 are provided to enable a user to enter textual names for the reports that they will receive in connection with service 1. An analysis scope definition section 456 enables a user to select a particular control system for analysis and to further specify what types of function blocks are to be analyzed. Pull down arrows 458 and 460 may be selected by the user to view a menu of control systems that may be analyzed and the types of function blocks that are available for analysis. An error type selection area 462 enables a user to select one or more types of errors for which the control system and function block types selected in the section 456 will be analyzed. As shown by way of example, the user may select error types such as incorrect mode, limited control, uncertain input and large variability. A section 464 enables the user to select the number of modules that will be analyzed within the selected control system. As shown in FIG. 6, the user may specify a maximum number of modules or all modules within the selected control system may be selected for analysis. A report time span section 466 enables the user to select the time period for which service 1 will perform its analysis. By way of example, the user may specify the current shift, the previous shift, the current day or the previous day. Of course, other time periods could be offered for selection, if desired. A schedule information section 468 enables a user to configure the scheduler 134 (FIG. 1) to periodically obtain the information needed by service 1 from the selected control system, which may be coupled to an information server (such as the information server 114) via a network (such as the network 120) as a web service. If the schedule for the selected control system has not been defined, the user may select a configure schedule button 470 to configure the schedule as described in connection with FIG. 7 below. A destination information section 472 enables a user to select destinations (i.e., web services) to which analysis results generated by service 1 will be sent. The user may select a configure destination button 474 to configure destinations as described in connection with FIG. 8 below. The user may select a reset page button 476 to clear all the information entered or selected within the view or page 450 or may select a cancel button 478 to clear any selections or entries and return to another view (e.g., a home view or page). If the user wishes to accept the information entered and/or selected within the view or page 450, the user may select an OK button 480.

FIG. 7 is an example of a scheduler configuration view 500 that may be shown in the display area 406 of the window 400 if the user selects the configure button 470 shown in FIG. 6. The scheduler configuration view 500 includes a report name and description area 502 that displays the information entered by the user in the fields 452 and 454 shown in FIG. 6. Additionally, the scheduler configuration view 500 includes an analysis start time section 504, a period selection section 506, an analysis end time section 508, an OK button 510 and a cancel button 512. In the start time section 504, the user may enter or select a start date and time for the analysis performed by service 1 to begin. In the period selection section 506, the user may select the analysis period for service 1. For example, the user may specify that service 1 should repeat its analysis every certain number of minutes, hours, days, weeks, months, etc. In the analysis end time section 508, the user may configure service 1 to never stop its analysis, to stop its analysis after a certain number of analysis periods as defined in the period selection section 506, or to stop its analysis on a particular date. If the user selects the OK button 510, the information entered or selected by the user within the view 500 is saved and the view 450 again is shown in the active display area 406. On the other hand, if the user selects the cancel button 512, the information entered or selected within the view 500 is not saved and the view 450 is shown in the active display area 406.

FIG. 8 is an example of a configure destination view 520 that may be shown in the active display area 406 of the window 400 if the user selects the configure destination button 474 shown in FIG. 6. The configure destination view 520 includes a destination selection section 522. While the example view 520 shown in FIG. 8 only depicts an email destination selection option, the view 520 could display various other web service-based destinations for selection. For example, any of the exemplary web services (e.g., paging, email, personal data assistant, etc.) shown in FIG. 2 may be listed within configure destination the view 520 for selection by the user. In addition, a report type section 524 enables the user to specify whether the report that is sent to the selected destination or destinations is a detailed report or a summary report and whether the data format for the report is text-based, HTML-based or XML-based. The configure destination view 520 also includes an OK button 526, which, if selected by the user, saves the information selected or entered by the user and causes the view 450 (FIG. 6) to be displayed in the active display area 406.

After the user has finished selecting and/or entering configuration information for service 1 in the views 450, 500 and/or 520 as described above, the user may select the OK button 480 in the view 450 to send the configuration information to the information server 114 (FIG. 1) to carry out the configuration of the router 136 (FIG. 1) and the scheduler 134 (FIG. 1). Preferably, the configuration information is sent to the information server 114 together with a unique user identifier such as, for example, the UID and a service identifier uniquely associated with service 1 such as, for example, the SID. When the information server 114 receives the configuration information entered and/or selected by the user within the view 450 (along with the UID and the SID) from the graphical user interface 116, the information server 114 conveys the configuration information to the web service associated with service 1. The information server 114 may use the SID to retrieve communications interface information related to the web service for service 1 from its database 138 to thereby enable the information server 114 to properly convey the configuration information to the web service associated with service 1.

After the web service associated with service 1 receives the configuration information from the information server 114, the web service builds an XML stream, which may contain XML configuration information such as, for example, XML schemas that may be used to control the router 136 and the scheduler 134, and sends the XML stream back to information server 114 for storage within the database 138 along with the UID (associated with the current user of the graphical user interface 116) and the SID (associated with service 1). In this manner, the web service associated with service 1 instructs the information server 114 how the scheduler 134 and the router 136 must be configured to carry out the functions of service 1 as defined by the user within the views 450, 500 and/or 520. For example, the scheduler 134 may periodically retrieve data from the web service associated with service 1 and may send this retrieved data to particular destinations as defined by the user within the views 450, 500 and 520.

FIG. 9 is an example of a reports view 530 that provides information relating to reports that may be available to a user. The reports view 530 may be displayed in the active display area 406 (FIG. 5) in response to the user selecting service 1 under "My Reports" in the tree selection guide 404. The reports view 530 includes a caption section 532, an available reports detail section 534, a delete selected report button 536 and an add new report button 538. The caption section 532 may include information relating to the current user of the graphical user interface 116 and the particular web service selected (which in this example is service 1). The available reports detail section 534 may include a table of all the reports that the user has configured for the selected service (i.e., service 1). As shown in FIG. 9, this table may contain report names, report descriptions, destination types and descriptions specified by the user for each of the reports, and report status information (i.e., whether the report is enabled or active or currently not enabled or inactive). The user may use the delete selected report button 536 to eliminate a report for the selected service (i.e., service 1) and/or may select the new report button 538 to define a new report using, for example, the views shown in FIGS. 6-8.

Figure 10:
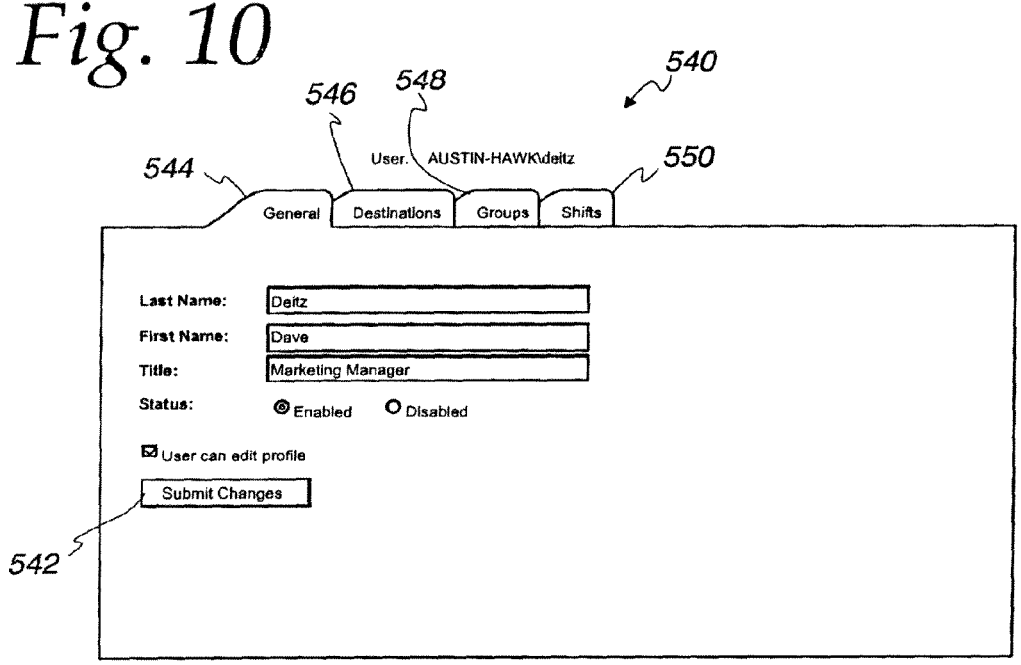

FIG. 10 depicts an example of a user profile general information view 540 that may be displayed within the active area 406 in response to selection of "My Profile" in the selection tree 404. As shown in FIG. 10, the user profile general information view 540 may include user name and organization title or role information, status information indicating whether the user is currently enabled or disabled from interacting with the user interface 116, information relating to whether the user can edit their own profile and a submit changes button 542 that enables a user to submit changes to their profile (assuming the user is permitted to edit their own profile). As is also shown in FIG. 10, a group of tabs 544-550 may be provided to enable the user to easily navigate among the various views that are associated with user profiles. \u/be example shown in FIG. 10, the general information tab 544 has been selected. However, the user may, if desired, select the destinations tab 546, the groups tabs 548 or the shifts tab 550 to invoke other profile views shown and described below in connection with FIGS. 11-13.

Figure 11:
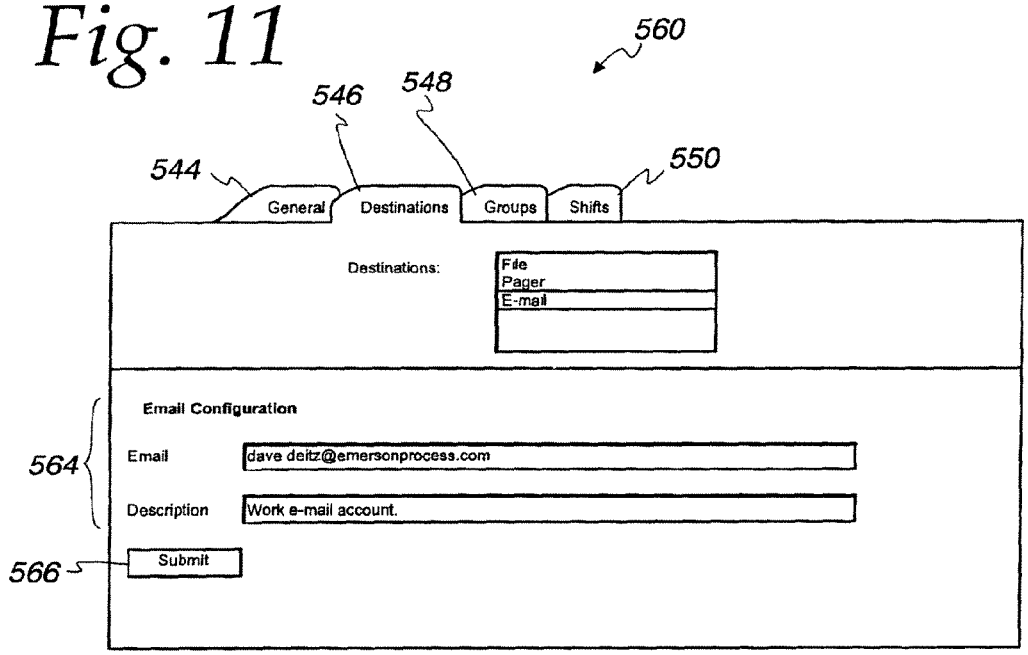

FIG. 11 depicts an example of a destinations configuration view 560 that may be displayed within the active area 406 when the destinations tab 546 (FIG. 10) is selected. As shown in FIG. 11, the destinations configuration view 560 includes a destinations selection section 562 that enables a user to select a destination type for configuration. As shown by way of example, available destinations may include an email web service, a paging web service, a file system web service, or any other web service. In addition, the destinations configuration view 560 includes a configuration section 564 that enables a user to enter configuration information for the destination selected within the destination selection section 562. Because "E-mail" has been selected within the destinations selection section 562 in the example shown in FIG. 11, the configuration section 564 includes areas for the user to enter an email address and a textual description of that email address. Of course, if the paging web service, the file system web service, or if some other web service were selected within the destinations selection 562, the configuration section 564 may include different areas request appropriate information from the user. The destinations configuration view 560 also includes a submit button 566 that, when selected by a user, submits the information entered by the user for subsequent transmission to and use by the information server 114.

Figure 12:
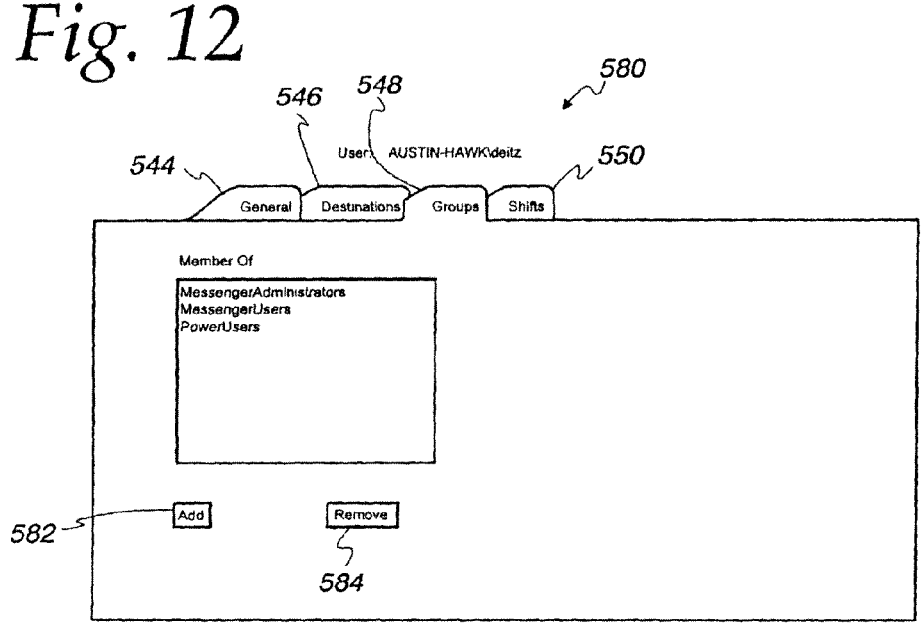

FIG. 12 depicts a groups view 580 that may be displayed within the active display area 406 when the groups tab 548 (FIG. 10) is selected. As shown in FIG. 12, the groups view 580 displays a list of the groups to which the user belongs and also includes add and remove buttons 582 and 584 that enable a user to add or delete a group membership, respectively. Preferably, the groups to which users may belong correspond to organizational roles such as, for example, supervisor, manager, etc. As described herein, the group to which a user belongs may affect the type of information which can be accessed and/or changed by that user. System security concerns may dictate that only managers, for example, may have access to enter or change the group to which other employees are assigned.

The system and technique described herein may also use distribution lists, which are distinct from the groups discussed above. In general a distribution list may, for example, contain people from different groups that have something in common. For example, a distribution list may consist of employees that are all involved with a particular project, all employees within a particular building or facility, etc. The system described herein may maintain distribution lists as tables or other similar data structures that the users that are members of the list as well as corresponding user identifiers (i.e., UIDs) and configuration and/or profile information, which includes group membership information. In this manner, in the event that information is to be conveyed using a distribution list, the communications engine 140 may convey the information to users within the distribution list in different manners based on their user profile and/of configuration information. For example, one user within a distribution list may receive the information via email, while other users within the list may receive the information via their pagers or in some other requested or specified manner.

Figure 13:
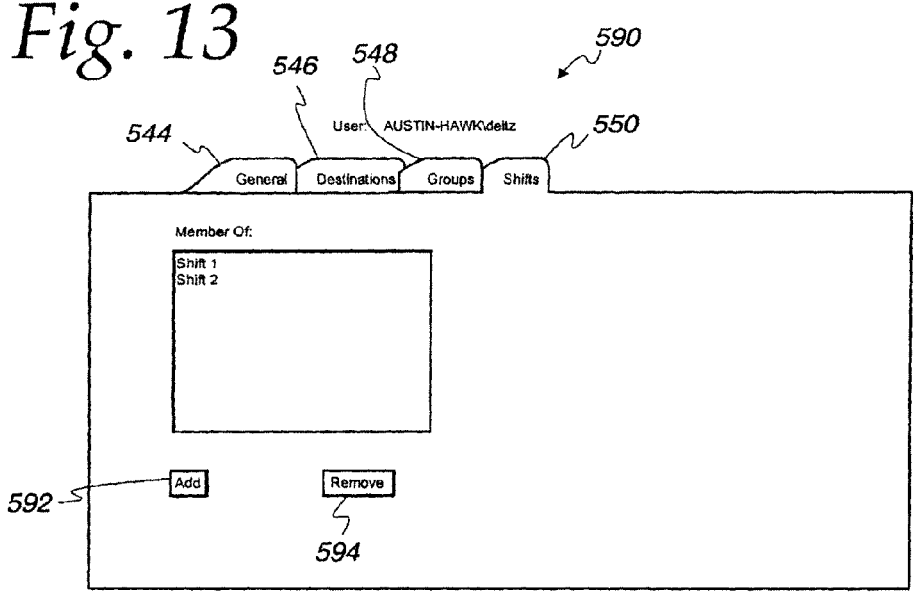

FIG. 13 depicts a shifts view 590 that may be shown within the active display area 406 when the shifts tab 550 is selected. As shown in FIG. 13, the shifts view 590 includes a list of work shifts with which the user is associated and also includes add and remove buttons 592 and 594 that, when selected, enable a user to add or remove a shift, respectively.

Figure 14:
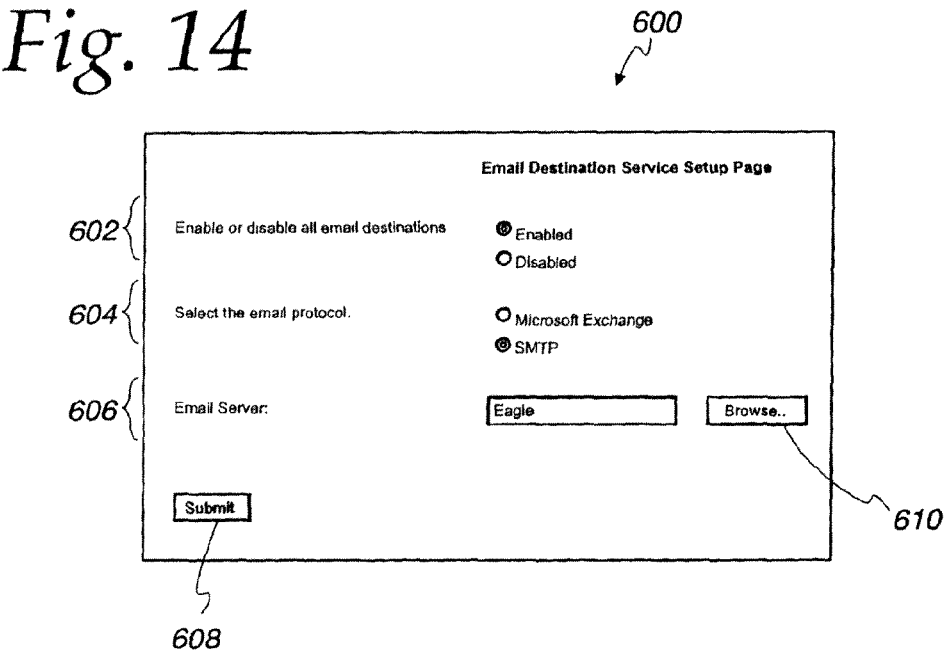

FIG. 14 depicts an email destination service setup view 600 that may be displayed within the active display area 406 when "Destinations Setup" under the "Administration" portion of the tree selection guide 404 has been selected by a user. As shown in FIG. 14, the email destination service setup view 600 may include an enable/disable section 602, an email protocol selection section 604, an email server selection section 606 and a submit button 608. The enable/disable section 602 enables a user to enable or disable all email destinations. The email protocol selection section 604 enables a user to select an email protocol such as, for example, Microsoft Exchange or SMTP, for use by the email web service. The email server selection section 606 enables a user to select a server for use by the email web service. The email server selection section 606 may also provide a browse button 610 that enables a user to browse for available servers. The user may select the submit button 608 to save and put into effect the information entered and/or selected within the view 600.

Figure 15:
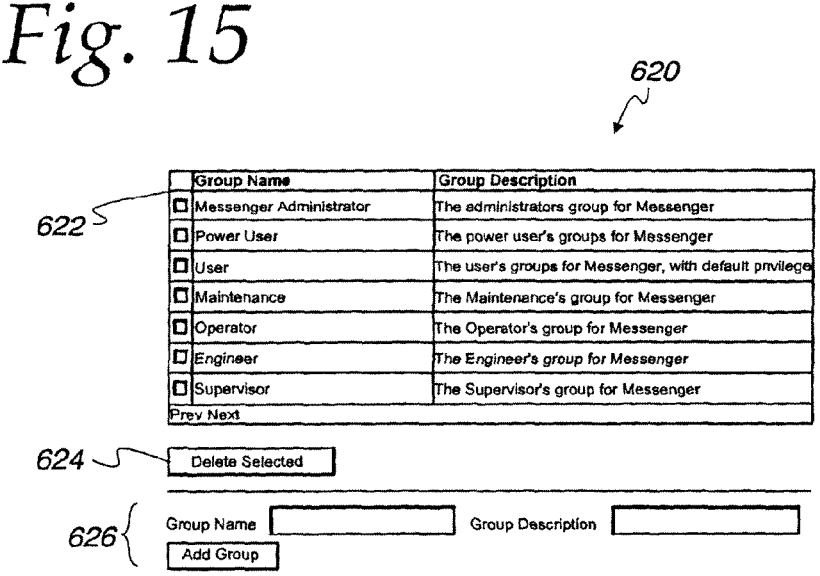

FIG. 15 depicts a group setup view 620 that may be displayed within the active display area 406 when "Group Setup" within the "Administration" portion of the selection tree 404 has been selected. As shown in FIG. 15, the group setup view 620 may include a table 622 that lists the various group names and descriptions thereof that have been configured, a delete selected button 624 that enables a user to delete one or more groups displayed within the table 622 and an add group section 626 that enables a user to add a group (i.e., a group name and accompanying description) to the table 622.

Figure 16:
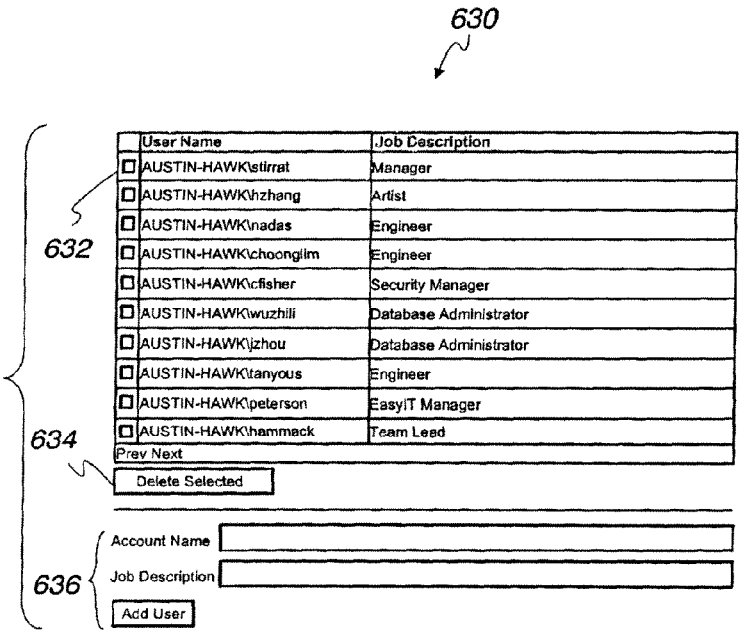

FIG. 16 depicts a user setup view 630 that may be displayed within the active display area 406 when "User Setup" within the "Administration" portion of the selection tree 404 has been selected. As shown in FIG. 16, the user setup view 630 may include a user table 632 that list the names and job descriptions of users that have been authorized to interact with the system 100 (FIG. 1) via the graphical user interface 116. A delete selected user button 634 may be selected by an authorized user to eliminate a user from the table 632, thereby preventing that user from interacting with the graphical user interface 116 and the system 100. An add user section 636 enables an authorized user to enter new user names and job descriptions into the table 632.

Figure 17:
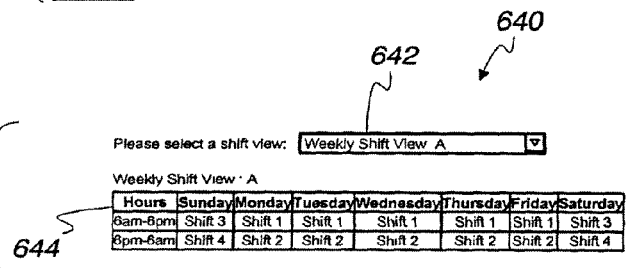

FIG. 17 depicts a shift setup view 640 that may be displayed within the active display area 406 when "Shift Setup" within the "Administration" portion of the selection tree 404 has been selected. As shown in FIG. 17, the shift setup view 640 may include a view selection section 642 that enables an authorized user to specify the manner in which shift information is displayed in a table 644. For example, a user may select a weekly shift view for a particular shift (as shown in FIG. 7) or may select a view that displays shift information for one or more shifts simultaneously for various time periods.

Figure 18:
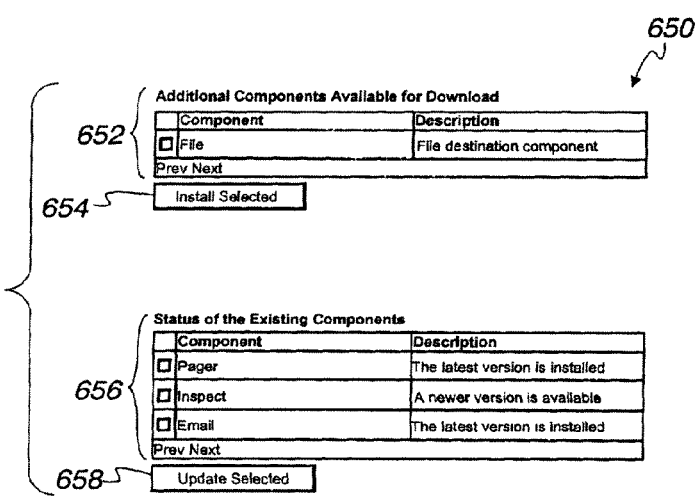

FIG. 18 depicts a component setup view 650 that may be displayed within the active display area 406 when "Component Setup" under the "Administration" portion of the tree selection guide 404. As shown in FIG. 18, the component setup view 650 may include an additional components section 652 that displays additional components that are available for download. The additional components section 652 may list the names and descriptions of available applications or web services that may be added to the system 100 and configured to communicate with the information server 114 and other system components including the graphical user interface 116. An install selected button 654 may be selected to initiate the download and/or installation of any components selected within the components section 652. The component setup view 650 may also include a status section 656 that displays the status of components that have already been downloaded or installed. For example, the status information may include a component name and a description of the version status of that component. In particular, the status description may indicate whether the latest version of a component has been installed or downloaded, whether a newer version is available, etc. In the event that a newer version of an already installed or downloaded component is available, a user may select an update button 658 to initiate a download or installation of the newer version.

Figure 19:
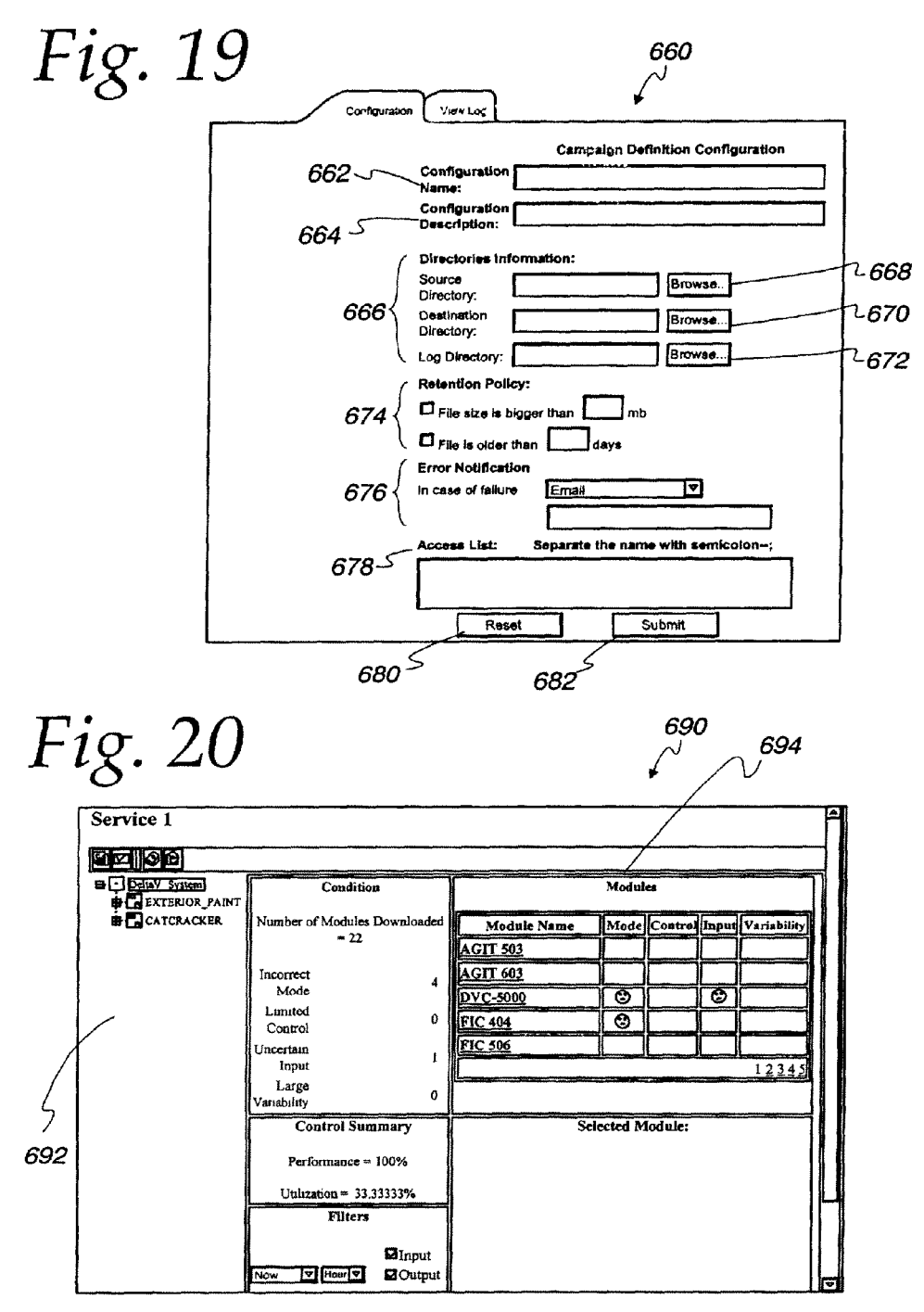

FIG. 19 depicts a campaign service configuration view 660 that may be displayed within the active display area 406 when a campaign scheduling service configuration has been selected. As shown in FIG. 19, the campaign service configuration view 660 includes configuration name and description fields 662 and 664, in which a user may enter a name and description of a new campaign, a directories information section 666 having associated browse buttons 668, 670 and 672, a retention policy section 674, an error notification section 676, an access list section 678, a reset button 680 and a submit button 682. A user may enter a source directory, a destination directory and a log directory within the directories information section 666 and may use the browse buttons 668-672 to facilitate finding and/or selecting these directories. In the retention policy section 674, a user may specify the age and size of files that are to be deleted. In the error notification section 676, a user may specify how and to whom campaign execution errors are to be transmitted. For example, a user may specify that error notifications are to be sent via email to a particular user. In the access list section 678, a user may specify what users may access information relating to the campaign being defined. The reset button 680 may be selected to clear any information previously entered or selected (but not yet submitted) within the view 660. The submit button 682 may be selected to submit a campaign definition, which may be conveyed to a campaign management web service (e.g., the web service 218 shown in FIG. 2) for execution.

FIG. 20 depicts a service 1 view 690 that may be displayed within the active display area 406 when "Service 1" under the "Views" portion of the tree selection guide 404 has been selected. As shown in FIG. 20, the service 1 view 690 may include a tree 692 that shows the various portions of a process plant or control system for which service 1 is performing its analyses. The service 1 view 690 also includes an analyses summary display 694 that provides data or analysis results associated with the control system (or portion of a control system or plant) that service 1 is analyzing.

It is important to recognize that the availability of the views provided by the graphical user interface 116, examples of which are described in connection with FIGS. 5-20 above, may be subject to the different access levels that may be provided to the users. In other words, a very limited number of users may be authorized to view and interact with the "Administration" views because these views generally permit a user to enable or disable other users, define groups, and to generally perform setup or configuration functions that should be of limited availability. One or a few users may have system administrator status that permits them to interact with the graphical user interface 116 within the "Administration" views. On the other hand, all users authorized to interact with the graphical user interface 116 by the system administrator should be given authorization to define the reports that they wish to see. However, these same users may or may not be given authorization to change their own profile. Authorizations for each user may be stored within the database 138 of the information server 114 and may be retrieved to determine whether a request to invoke a view, enter information within a view, etc. by a particular user at the graphical user interface 116 should be granted or denied for that particular user.

Further, while the selection tree 404 depicted in FIG. 5 shows only two available services (i.e., service 1 and service 2), any other number of available services may be shown in tree 404. For example, in the example system 200 shown in FIG. 2, the graphical user interface 116 may display a selection tree that lists all the web services 202-220. Still further, the views shown in FIGS. 5-20 are only examples and any other views that facilitate configuration of the information server 114, web services, etc. and/or viewing of information available within the systems 100 and 200 may be used instead.

While the views shown in FIGS. 5-20 are depicted as being displayed separately or individually, multiple views may be arranged and displayed together, if desired. Multiple views may be combined and displayed together to facilitate configuration activities, viewing of system data troubleshooting, etc. More specifically, views associated with web services that interact or interoperate with one another may be combined and displayed together using an arrangement of relatively smaller displays windows, for example.

While the web services-based communication system and technique described herein has been described as being implemented using an XML-based server, it can be implemented using any other suitable transactional data language on any suitable hardware platform. Further, although the functions of the information server described herein are described herein as being implemented primarily as software, some or all of these functions may be implemented in hardware, firmware, etc. Thus, the web services-based communication system and technique described herein may be implemented in a standard multi-purpose processor or using specifically designed hardware or firmware as desired. When implemented in software, the software routines may be stored in any computer readable memory such as on a magnetic disk, a laser disk, or other storage medium, in a RAM or ROM of a computer or processor, etc. Likewise, the software may be delivered to a user or a process control system via any known or desired delivery method including, for example, on a computer readable disk or other transportable computer storage mechanism or over a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of communicating process control information, the process control information having content therein, comprising:

sending a first message containing the process control information from a first web service to an information server in response to a change in the process control information and including only the changed information in the content of the first message;

discovering a second web service, from among a plurality of web services identified by a discovery server with the second web service adapted to generate a message based on a message received from the first web service and automatically send the generated message, associated with the information server;

processing the first message within the information server to determine the second web service based on the content of the process control information to which the process control information is to be sent; and sending a second message containing the process control information from the information server to the second web service.

2. The method of claim 1, wherein sending the first message containing the process control information from the first web service to the information server in response to the change in the process control information includes sending the first message containing the process control information to the information server in response to a change in a value of a process control parameter.

3. The method of claim 1, wherein processing the first message within the information server includes using a router within the information server to determine the second web service based on routing information stored within a database of the information server.

4. The method of claim 3, wherein using the router within the information server to determine the second web service based on the routing information stored within the database of the information server includes using a schema stored within the database to provide the routing information.

5. The method of claim 1, wherein sending the first message containing the process control information includes sending the first message using an extensible markup language and a network transport protocol, and wherein sending the second message containing the process control information includes sending the second message using the extensible markup language and the network transport protocol.

6. A system for communicating process control information, the process control information having content therein, comprising:
   an information server configured to receive a first message containing process control information from a first web service in response to a change in the process control information and including only the changed information in the content of the first message; and
   a discovery server configured to discover a second web service, from a plurality of web services identified by the discovery server with the second web service adapted to generate a message based on a message received from the first web service and automatically send the generated message, associated with the information server;
   wherein the information server is further configured to:
   process the first message within the information server to determine the second web service based on the content of the process control information to which the process control information is to be sent; and
   to send a second message containing the process control information from the information server to the second web service.

7. The system of claim 6, wherein the information server is further configured to receive the first message containing the process control information from the first web service in response to the change in the process control information includes receiving the first message containing the process control information to the information server in response to a change in a value of a process control parameter.

8. The system of claim 6, wherein the information server is further configured to use a router within the information server to determine the second web service based on routing information stored within a database of the information server.

9. The system of claim 8, wherein the router within the information server is configured to determine the second web service based on the routing information stored within the database of the information server which includes using a schema stored within the database to provide the routing information.

10. The system of claim 6, wherein the information server is further configured to receive the first message containing process control information which includes the first message which uses an extensible markup language and a network transport protocol, and the second web service is configured to receive the second message containing the process control information which includes receiving the second message which uses the extensible markup language and the network transport protocol.

* * * * *